(12) United States Patent
Kim et al.

(10) Patent No.: US 6,671,020 B2
(45) Date of Patent: Dec. 30, 2003

(54) MULTI-DOMAIN LIQUID CRYSTAL DISPLAY DEVICE

(75) Inventors: Kyeong Jin Kim, Puchon-shi (KR); Yun Bok Lee, Anyang-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 210 days.

(21) Appl. No.: 09/748,868

(22) Filed: Dec. 28, 2000

(65) Prior Publication Data

US 2001/0019391 A1 Sep. 6, 2001

(30) Foreign Application Priority Data

Dec. 31, 1999 (KR) ..................... P 1999-67947

(51) Int. Cl.⁷ ............................................... G02F 1/13
(52) U.S. Cl. ..................................................... 349/129
(58) Field of Search ................... 349/129, 123, 349/143, 141, 148

(56) References Cited

U.S. PATENT DOCUMENTS

| 6,141,077 | A  | * | 10/2000 | Hirata et al. ................. 349/143 |
| 6,292,247 | B1 | * | 9/2001  | Koma et al. ........... 252/299.63 |
| 6,300,996 | B1 | * | 10/2001 | Matsuyama et al. ......... 349/143 |
| 6,313,899 | B1 | * | 11/2001 | Wu et al. .................... 349/129 |
| 6,356,335 | B1 | * | 3/2002  | Kim et al. ................... 349/129 |
| 6,396,554 | B1 | * | 5/2002  | Matsuda ..................... 349/139 |
| 6,407,791 | B1 | * | 6/2002  | Suzuki et al. ............... 349/129 |
| 6,449,025 | B2 | * | 9/2002  | Lee ............................ 349/117 |

* cited by examiner

Primary Examiner—James Dudek
(74) Attorney, Agent, or Firm—McKenna Long & Aldridge LLP

(57) ABSTRACT

A multi-domain liquid crystal display device includes first and second substrates having pixel regions; a liquid crystal layer formed between the first substrate and the second substrate; a plurality of dielectric structures formed on the first substrate at predetermined intervals; and a pixel electrode having a plurality of electric field induction windows formed to alternate with the dielectric structures.

40 Claims, 35 Drawing Sheets

MULTI-DOMAIN LIQUID CRYSTAL DISPLAY DEVICE

This application claims the benefit of Korean Patent Application No. 1999-67947, filed on Dec. 31, 1999, which is hereby incorporated by reference for all purposes as if fully set forth herein.

BACKGROUND OF THE INVENTION

1. Field of the Invention

The present invention relates to a liquid crystal display device, and more particularly, to a multi-domain liquid crystal display device in which a common auxiliary electrode is formed around and in a pixel region on a same layer as a gate line, and at least one or more electric field induction windows and dielectric structures are formed in the pixel region.

2. Discussion of the Related Art

Among flat-panel displays enjoying image quality equivalent to the image quality offered by a cathode ray tube (CRT) display, it is a liquid crystal display (LCD) that has been most widely adopted nowadays. In particular, a thin-film transistor (TFT) type LCD (TFT-LCD) has been adapted to widely used equipment such as personal computers, word processors, office automation equipment, and home electrical appliances, including portable television sets. The market for such equipment, using TFT-LCDs, is expected to expand. Accordingly, there is demand for further improvement in image quality. A description will be made by using a TFT-LCD as an example. However, the present invention is not limited to a TFT-LCD, but can apply to a simple matrix LCD, a plasma addressing type LCD, and so forth. Generally, the present invention is applicable to LCDs which include liquid crystal sandwiched between a pair of substrates on which electrodes are respectively formed and produce image displays by applying voltage between the electrodes.

Currently, a mode most widely adopted for the TFT-LCD is a normally-white mode that is implemented in a twisted nematic (TN) LCD. The technology of manufacturing the TN TFT-LCD has advanced extraordinarily in recent years. Contrast and color reproducibility provided by the TN TFT-LCD have surpassed those offered by the CRT. However, the TN LCD has a critical drawback of a narrow viewing angle range. This poses a problem that the application of the TN LCD is limited. FIGS. 1A to 1C are diagrams for explaining this problem.

In the Figures, reference numerals 11 and 12 indicate substrates and reference numberal 14 indicates liquid crystal. FIG. 1A shows a state of white display to which no voltage is applied and liquid crystal molecules are aligned in the same direction with a slight inclination (about 1° to 5°). For convenience, throughout the figures, liquid crystal molecules are illustrated as in FIG. 1A. In this white display state, light is seen as nearly white in any azimuth. Moreover, as shown in FIG. 1C, in the state in which a voltage is applied, intermediate liquid crystal molecules except those located near the alignment films (not shown), over the substrates, are aligned in a vertical direction. Incident linearly-polarized light is therefore seen as black but not twisted. At this time, light obliquely incident on an LCD screen (panel) has a direction of polarization that is twisted to some extent, because the light passes obliquely through the liquid crystal molecules that are aligned in the vertical direction. The light is therefore seen as halftone (gray) but not perfect black. As shown in FIG. 1B, in the state in which an intermediate voltage lower than the voltage applied in the state shown in FIG. 1C is applied, the liquid crystal molecules near the alignment films are aligned in a horizontal direction but the liquid crystal molecules in the middle parts of cells erect themselves halfway. The birefringent property of the liquid crystal is lost to some extent. This causes transmittance to deteriorate and brings about halftone (gray) display. However, this effect occurs only for light incident perpendicularly on the liquid-crystal panel. Obliquely incident light is seen differently, that is, light is seen differently depending on whether it is viewed from the left or right side of the drawing. As illustrated, the liquid crystal molecules are aligned mutually parallel relative to light propagating from right below to left above. The liquid crystal hardly exerts a birefringent effect. Therefore, when the panel is viewed from left, it appears black. By contrast, the liquid crystal molecules are aligned vertically relative to light propagating from below to right above. The liquid crystal exerts a great birefringent effect relative to incident light, and the incident light is twisted. This results in nearly white display. Thus, the most critical drawback of the TN LCD is that the display state varies depending on the viewing angle.

It is known that viewing angle performance of a liquid crystal display device (LCD) in the TN mode can be improved by setting the orientation directions of the liquid crystal molecules inside pixels to a plurality of mutually different directions. Generally, the orientation direction of the liquid crystal molecules (pre-tilt angles) is restricted by the direction of a rubbing treatment applied to the alignment film on the surfaces of the substrates as the liquid crystal molecule contact the alignment film. The rubbing treatment is a process, during which the surface of the alignment film is rubbed in one direction by a cloth such as rayon. The liquid crystal molecules are orientated in the rubbing direction. Therefore, viewing angle performance can be improved by making the rubbing direction different inside the pixels.

FIGS. 2A to 2C show a method of making the rubbing direction different inside the pixels. As shown in this drawing, an alignment film 22 is formed on a glass substrate 16 (whose electrodes, etc., are omitted from the drawing). This alignment film 22 is then bought into contact with a rotating rubbing roll 201, which rotates in a first direction, to perform the rubbing treatment in one direction. Next, a photo-resist is applied to the alignment film 22, and a predetermined pattern is exposed and developed by photolithography. As a result, a layer 202 of the photo-resist, which is patterned, is formed as shown in FIG. 2B. Next, the alignment film 22 is brought into contact with a rubbing roll 201, which rotates in a second direction opposite to the first direction so that only the open portions of the pattern are rubbed. In this way, a plurality of regions that are subjected to the rubbing treatment in different directions are formed within the pixel, and the multiple orientation directions of the liquid crystal are formed in the pixel. Incidentally, the rubbing treatment can be done in arbitrarily different directions when the alignment film 22 is rotated relative to the rubbing roll 201.

In the process described above, there are some problems creating boundaries for the different orientation directions of the liquid crystal molecules for improving the viewing angle performance in a vertical alignment (VA) LCD.

It is desirable to improve a viewing angle characteristic of a VA liquid crystal display, and to create a VA liquid crystal display exhibiting a viewing angle characteristic that is as good or better than the one exhibited by in-plane switching mode LCDs, while permitting the same contrast and operating speed as the conventional liquid crystal displays.

In the VA mode employing a conventional vertical alignment film and using a negative liquid crystal as a liquid crystal material, a domain regulating means is included for regulating the orientation of a liquid crystal in which liquid crystal molecules are aligned obliquely when a voltage is applied so that the orientation will include a plurality of directions within each pixel. The domain regulating means is provided on at least one of the substrates. Further, at least one of domain regulating means has inclined surfaces (slopes). The inclined surfaces include surfaces which are almost vertical to the substrates. Rubbing need not be performed on the vertical alignment film.

In the VA-LCD device, when no voltage is applied, in almost all regions of the liquid crystal other than the protrusions, liquid crystal molecules are aligned nearly vertical to the surfaces of the substrates. The liquid crystal molecules near the inclined surfaces also orient vertically to the inclined surfaces, therefore, the liquid crystal molecules are inclined. When a voltage is applied, the liquid crystal molecules tilt according to electric field strength. Since the electric fields are vertical to the substrates, when a direction of tilt is not defined by a rubbing process, the azimuth in which the liquid crystal molecules tilt due to the electric fields includes all directions of 360°. If there are pre-tilted liquid crystal molecules, surrounding liquid crystal molecules are tilted in the directions of the pre-tilted liquid crystal molecules. Even when rubbing is not carried out, the directions in which the liquid crystal molecules lying in gaps between the protrusions can be restricted to the azimuths of the liquid crystal molecules in contact with the surfaces of the protrusions. When voltage is increased, the negative liquid crystal molecules are tilted in directions vertical to the electric fields.

Recently, a liquid crystal display device which drives a liquid crystal by an auxiliary electrode electrically insulated from a pixel electrode, without aligning the liquid crystal, has been suggested. Such a related art liquid crystal display device will be described with reference to FIG. 3.

As shown in FIG. 3, the related art liquid crystal display device includes a first substrate, a second substrate, a plurality of data lines 132 and gate lines 131b, a thin film transistor 134, and a pixel electrode 133. The data lines 132 and gate lines 131b are formed on the first substrate lengthwise and crosswise to divide the first substrate into a plurality of pixel regions. A dielectric projection 120a is formed on the pixel electrode in a zig-zag form, and a dielectric projection 120b is formed on the color filter layer in a formation similar to the dielectric projection 120a and is parallel to the dielectric projection 120a. Also, a light-shielding layer 135 is formed on a bending portion or a corner portion of the gate lines, the data lines, the thin film transistor and the dielectric projections 120a and 120b, so that light leaked therefrom is blocked.

The dielectric projections 120a and 120b divide the pixel region, and induce and distort the electric field applied to the liquid crystal layer. This means that dielectric energy due to the distorted electric field orients a liquid crystal director in a desired direction when a voltage is applied to the liquid crystal display device.

However, the liquid crystal display device has several problems. The dielectric projections 120a and 120b can obtain multi-domain effect, but reduce aperture ratio. To solve this problem, the dielectric projections are formed with narrow widths. However, the thick light-shielding layer 135 formed to prevent shadow from being generated at the bending or corner portion of the dielectric projections still causes problems related to aperture ratio.

Moreover, if the dielectric projections are not formed or if they have quite small widths, the distortion range of the electric field required to divide the domain is weak. Accordingly, there is a problem that the time it takes to orient the liquid crystal and to reach a stable state is increased.

SUMMARY OF THE INVENTION

Accordingly, the present invention is directed to a multi-domain liquid crystal display device that substantially obviates one or more of the problems due to limitations and disadvantages of the related art.

An object of the present invention is to provide a multi-domain liquid crystal display device in which a common auxiliary electrode is formed around and in a pixel region on the same layer as a gate line, and at least one or more electric field induction windows and dielectric structures are formed in the pixel region, so that response time of a liquid crystal layer and residual images are reduced and luminance is improved, thereby improving aperture ratio and viewing angle.

A multi-domain liquid crystal display device of the present invention is an improvement over the device of the Korean Patent Application No. 1999-07633, filed by the applicant of this invention, in which at least one or more electric field induction windows and dielectric structures are formed in a plurality of specific directions in a pixel region.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a multi-domain liquid crystal display device according to the present invention includes: first and second substrates having pixel regions; a liquid crystal layer formed between the first substrate and the second substrate; a plurality of dielectric structures formed on the first substrate at predetermined intervals; and a pixel electrode having a plurality of electric field induction windows formed to alternate with the dielectric structures.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

A multi-domain liquid crystal display device of the present invention will be described with reference to the accompanying drawings.

Figure 1A:
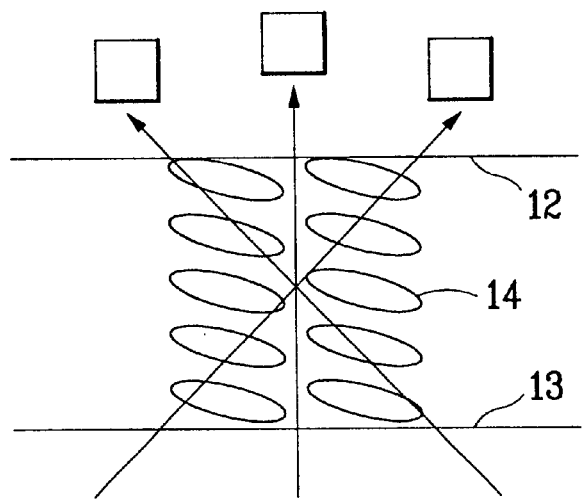
FIGS. 1A to 1C are diagram for explaining problem of TN TFT-LCD.
Figure 1B:
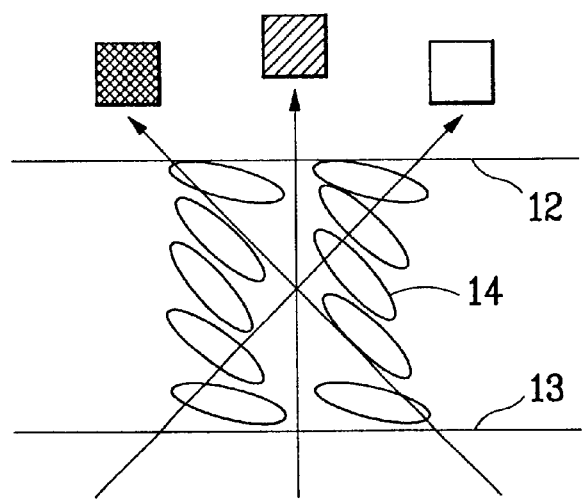
Figure 1C:
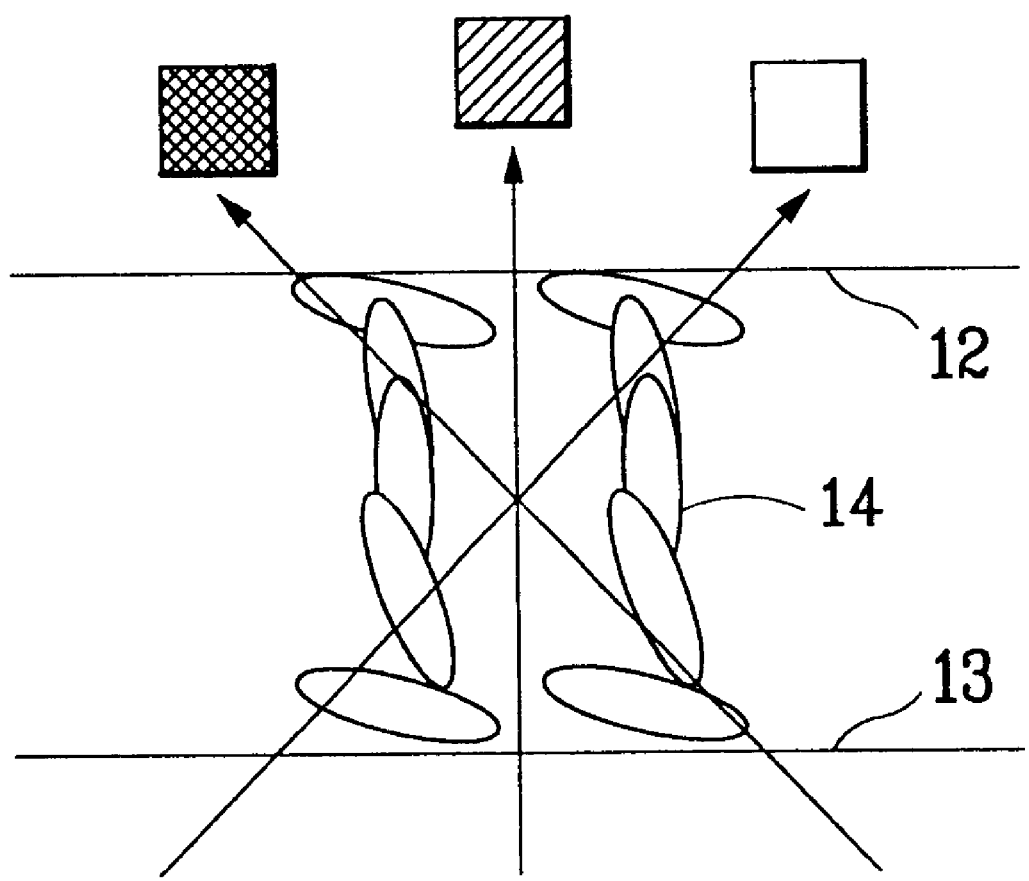
Figure 2A:
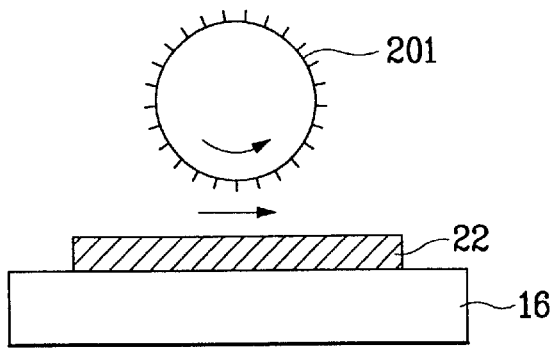
FIGS. 2A to 2C show a method of making the rubbing direction different inside the pixels.
Figure 2B:
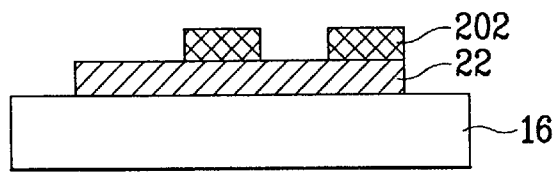
Figure 2C:
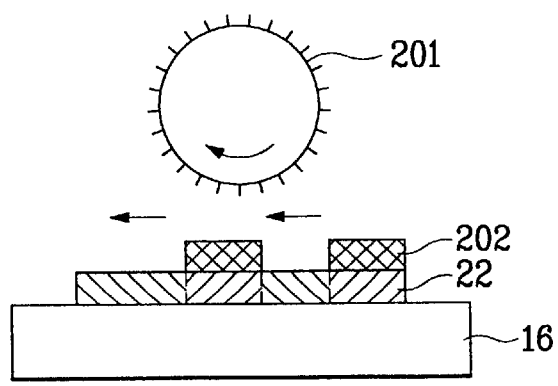
Figure 3:
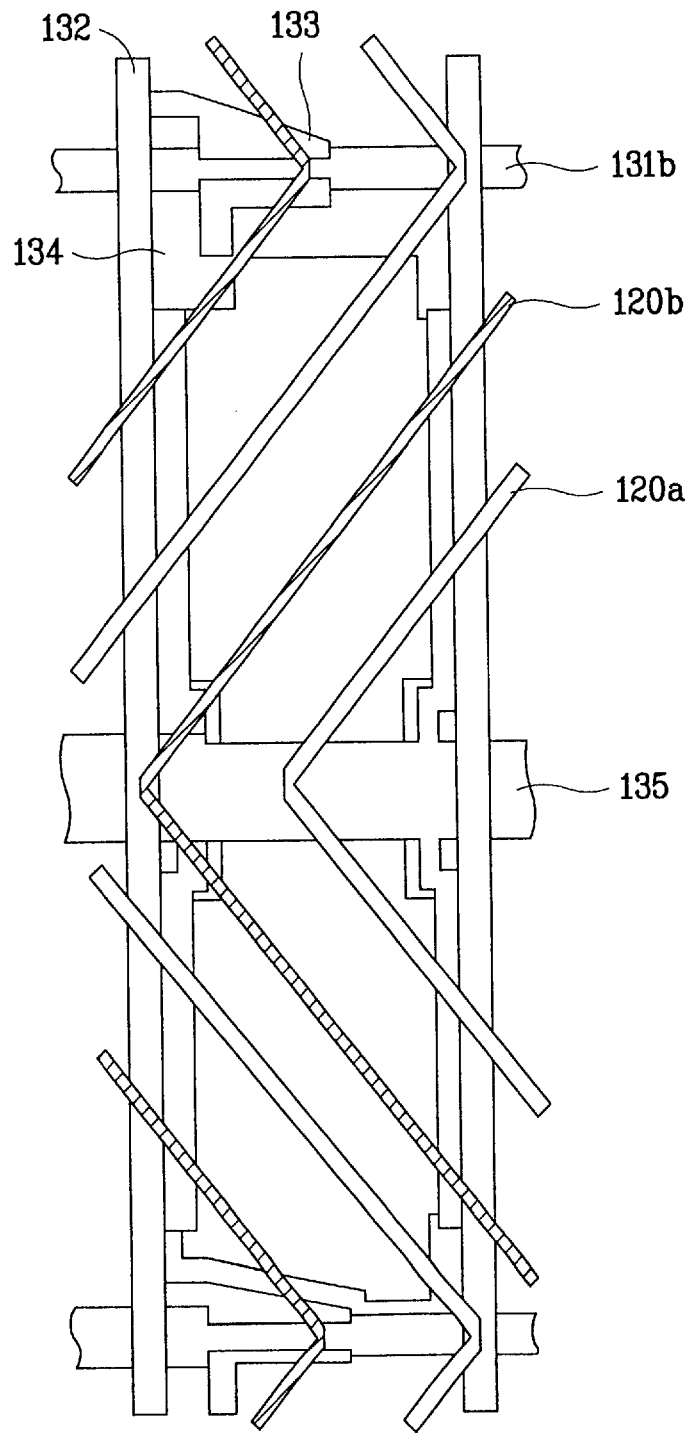
FIG. 3 is a plan view showing a related art liquid crystal display device.
Figure 4A:
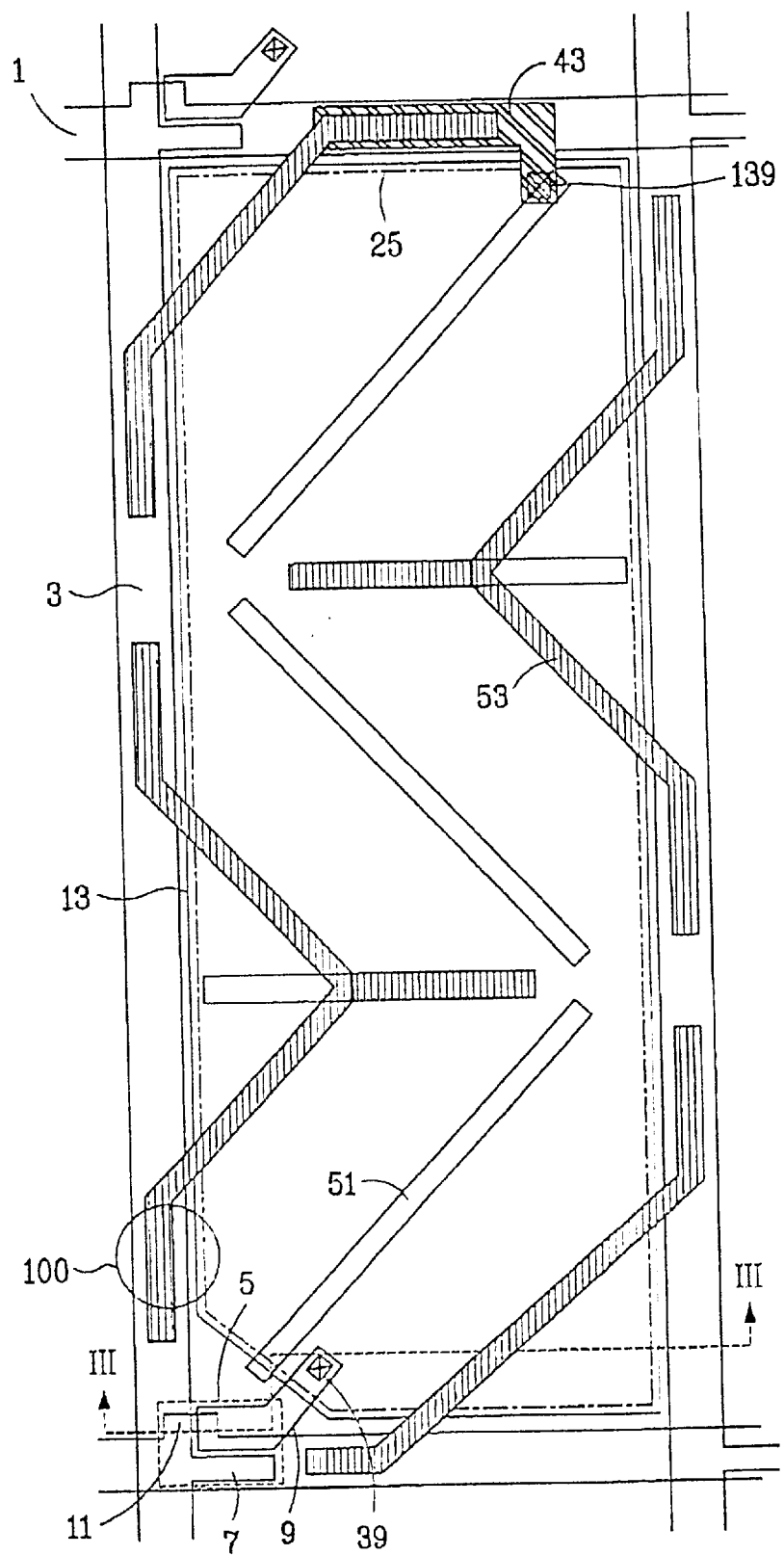
FIGS. 4A and 4B are plan views showing a unit pixel of a multi-domain liquid crystal display device according to the present invention.
Figure 4B:
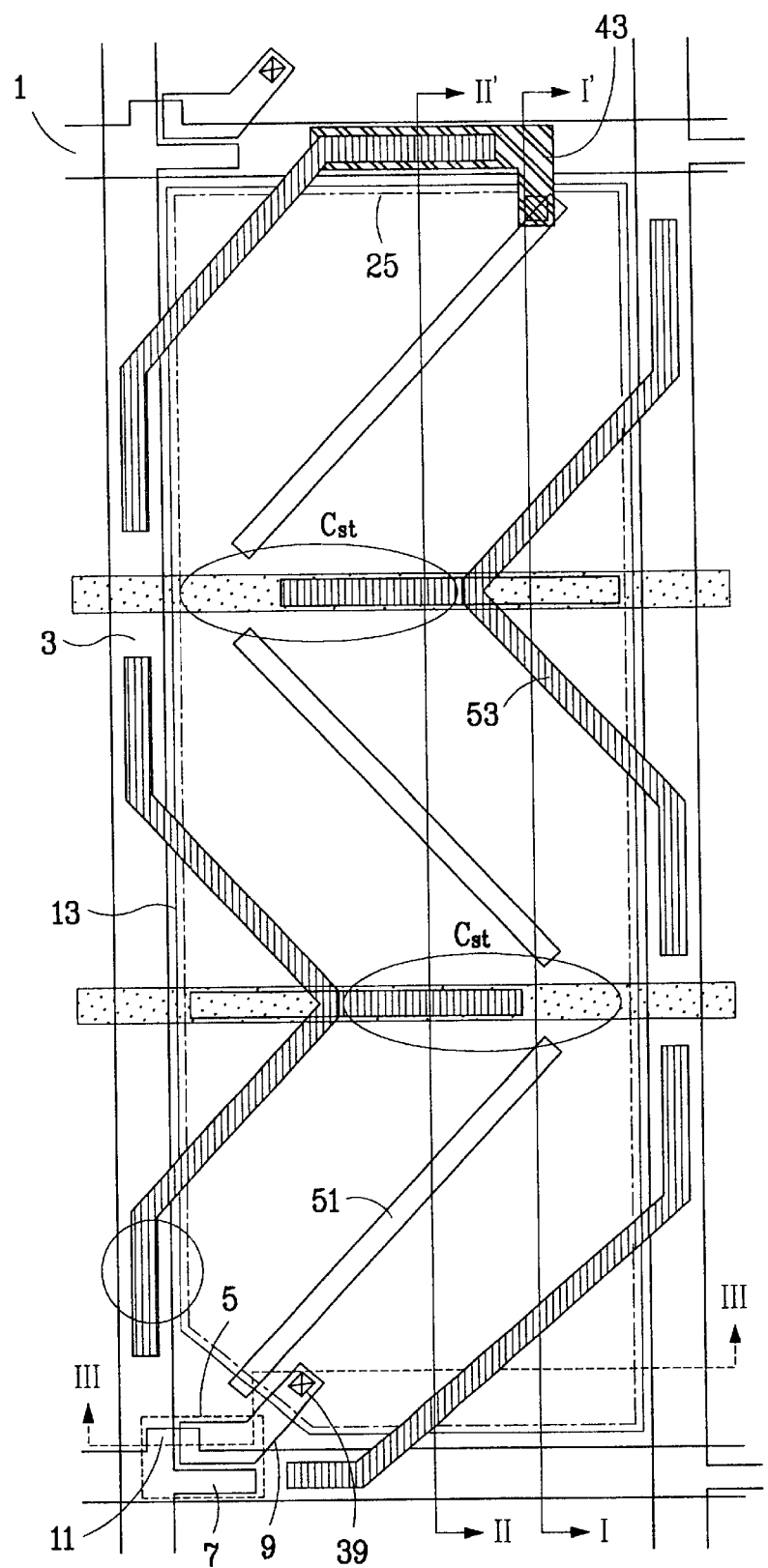
Figure 5A:
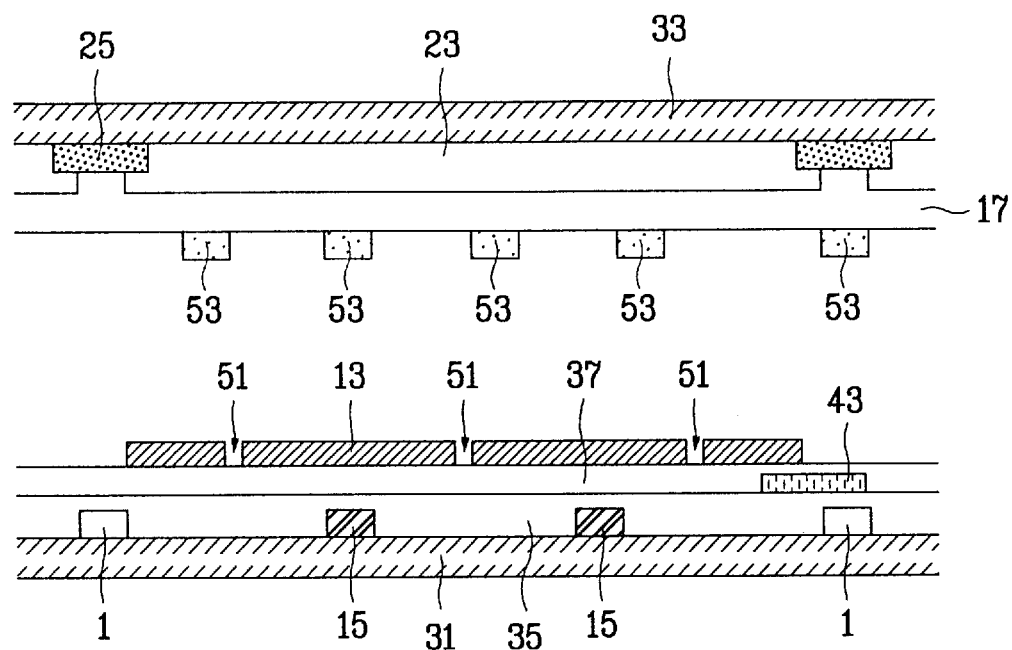
FIGS. 5A and 5B are sectional views showing a multi-domain liquid crystal display device, taken along lines I–I' and II–II' of FIG. 4B.
Figure 5B:
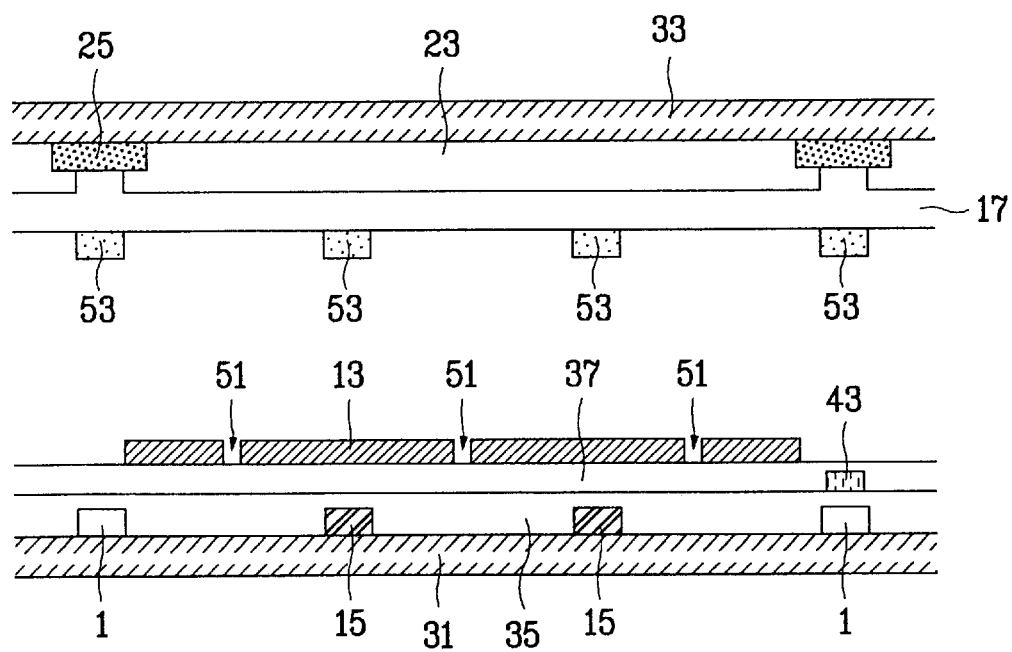

As shown in FIGS. 4 to 6, the multi-domain liquid crystal display device includes a first substrate 31, a second substrate 33, a plurality of data lines 3 and gate lines 1, a common auxiliary electrode 15, a thin film transistor, a passivation film 37, and a pixel electrode 13.

The data lines 3 and gate lines 1 are formed on the first substrate 31 lengthwise and crosswise to divide the first substrate into a plurality of pixel regions. The common auxiliary electrode 15 is formed around and/or in the pixel regions in a same layer as the gate lines to distort electric field. The thin film transistor is formed in each pixel region on the first substrate and includes a gate electrode 11, a gate insulating film 35, a semiconductor layer 5, an ohmic contact layer 6, and source/drain electrodes 7 and 9. The passivation film 37 is formed on an entire surface of the first substrate 31. The pixel electrode 13 is formed on the passivation film 37 to be connected with the drain electrode 9.

As shown in FIG. 4A, at least one or more electric field induction windows 51 are formed in the pixel electrode 13. The electric field induction windows 51 are formed in a plurality of specific directions to compensate electric field formed by the common auxiliary electrode 15.

The multi-domain liquid crystal display device further includes a light-shielding layer 25, a color filter layer 23 formed on the light-shielding layer 25, a common electrode 17 formed on the color filter layer 25, and a liquid crystal layer formed between the first substrate and the second substrate. The light-shielding layer 25 is formed on the second substrate 33 to shield light leaked from the gate lines 1, the data lines 3 and the thin film transistor.

A plurality of dielectric structures 53 are formed on the second substrate in different forms. The dielectric structures 53 control the electric field together with the electric field induction windows 51. Dielectric projections (portion 100 of FIG. 4) are formed at a boundary portion of the pixel regions, their bending or corner portion, or their crossing portion so that black spots are removed. That is to say, the dielectric projections of the dielectric structures act to eliminate shadow.

To fabricate the aforementioned multi-domain liquid crystal display device, the thin film transistor consisting of the gate electrode 11, the gate insulating film 35, the semiconductor layer 5, the ohmic contact layer 6 and the source/drain electrodes 7 and 9, is formed in each pixel region of the first substrate 31. At this time, the plurality of gate lines 1 and data lines 3 are formed to divide the first substrate 31 into a plurality of pixel regions.

Figure 6A:
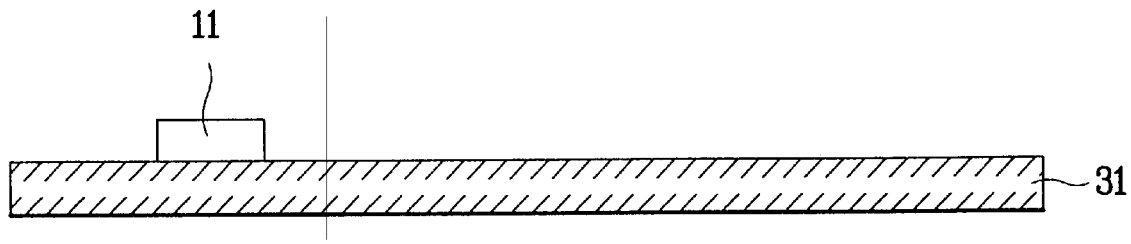
FIGS. 6A to 6E are sectional views showing a method for fabricating a multi-domain liquid crystal display device, taken along lines III–III' of FIG. 4A.
Figure 6B:
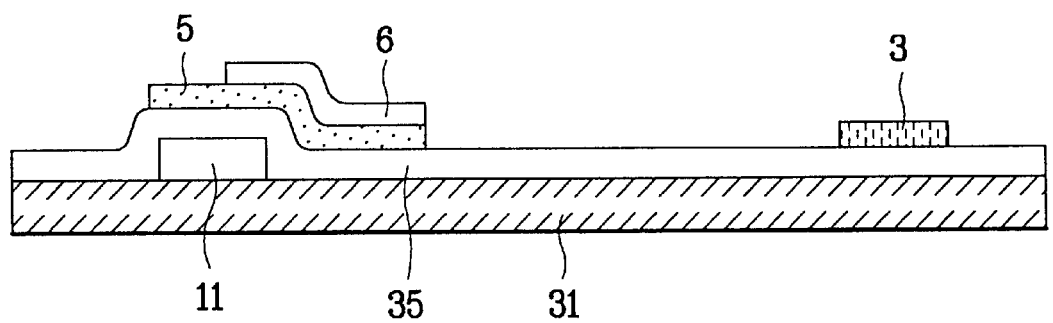

The gate electrode 11 and the gate lines 1 are formed in such a manner that metals such as Al, Mo, Cr, Ta, Al alloy or a dual layer formed of two of these metals, are layered by sputtering and patterned. At the same time, the common auxiliary electrode 15 is formed around and in the pixel region. The common auxiliary electrode 15 includes at least one or more electrodes in each pixel region and is electrically connected with a common auxiliary electrode of a neighboring pixel through a connecting portion (FIG. 6A).

The common auxiliary electrode 15 is formed on the same layer as the gate line 1 using one mask. The common auxiliary electrode is formed of the same material as the gate line 1 so that the common auxiliary electrode 15 is electrically connected with the common electrode 17. The common auxiliary electrode 15 may be formed of a material different from the gate line using an additional mask or different double layers.

Subsequently, the gate insulating film 35 is formed in such a manner that $SiN_X$ or $SiO_X$ is deposited on the gate electrode 11, the common auxiliary electrode 15 and the gate line 1 by plasma enhancement chemical vapor deposition (PECVD). The semiconductor layer 5 and the ohmic contact layer 6 are formed in such a manner that a-Si and $n^+$ a-Si are deposited by PECVD and patterned. Alternatively, the gate insulating film 35 is formed in such a manner that $SiN_X$ or $SiO_X$, a-Si and $n^+$ a-Si are successively deposited. The semiconductor layer 5 and the ohmic contact layer 6 are formed in such a manner that a-Si and $n^+$ a-Si are patterned. To improve aperture ratio, the gate insulating film 35 may be formed of BenzoCycloButene (BCB), acrylic resin, or polyimide compound.

Figure 6C:
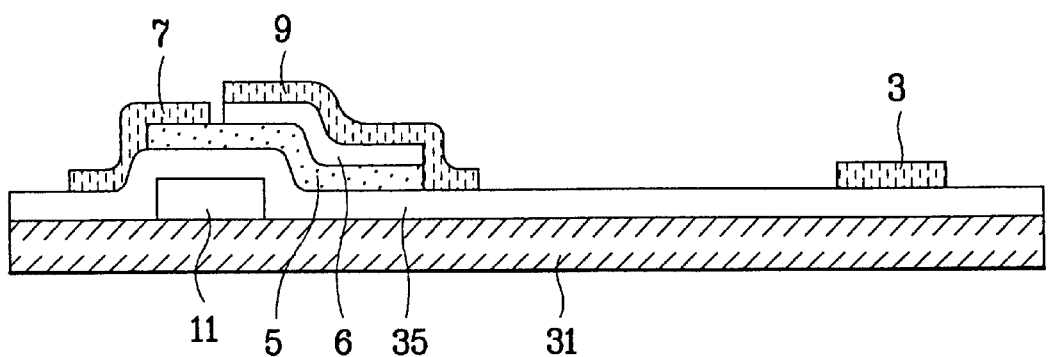
Figure 6D:
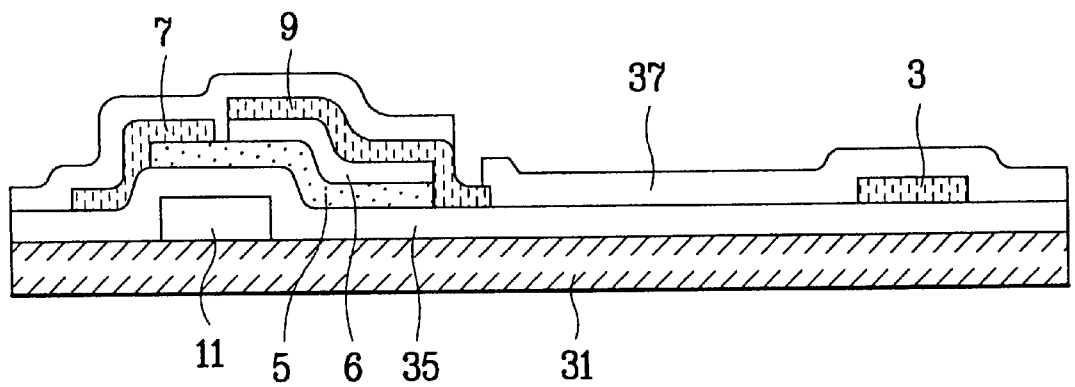

Metals such as Al, Mo, Cr, Ta or Al alloy, or a dual layer formed of two of these metals, are layered by sputtering and patterned so that the data lines 3 and the source/drain electrodes 7 and 9 are formed (FIGS. 6C–6D). At this time, a storage electrode 43 is formed to overlap the gate lines 1 and/or the common auxiliary electrode 15. The storage electrode 43 acts as a storage capacitor together with the gate lines 1 and/or the common auxiliary electrode 15.

Figure 6E:
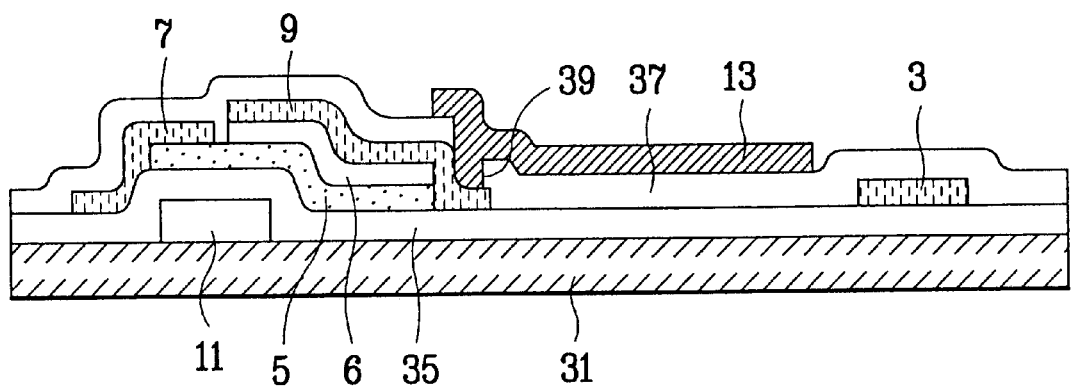

Subsequently, the passivation film 37 is formed of a material such as BCB, acrylic resin, polyimide compound, $SiN_x$ or $SiO_x$ on the first substrate 31. A metal such as indium tin oxide (ITO) is deposited by sputtering and patterned to form the pixel electrode 13 (FIGS. 6D–6E).

At this time, the storage electrode 43 extends to the pixel electrode 13 to overlap the pixel electrode 13, and the passivation film below the overlap portion is removed to form a contact hole 139 so that the pixel electrode 13 is electrically connected with the storage electrode 43. Also, in the same manner, the passivation film on the drain electrode 9 is selectively removed to form the contact hole 39 so that the pixel electrode 13 is connected with the drain electrode 9 through the contact hole 39 (FIGS. 4A, 4B).

At the same time, at least one or more electric field induction windows 51 are formed in a plurality of specific directions in the pixel electrode 13. The electric field induction windows act to compensate electric field formed by the common auxiliary electrode 15, thereby reducing response time of the liquid crystal display device.

In addition, an alignment film (not shown) may be formed on the pixel electrode 13.

In the embodiments according to the liquid crystal display device of the present invention, L-shaped thin film transistors having high aperture ratio are shown. The L-shaped TFT has an improved aperture ratio as compared with the related art because of its L-shape, and can reduce parasitic capacitance generated between the gate line 1 and the drain electrode 9.

Figure 7A:
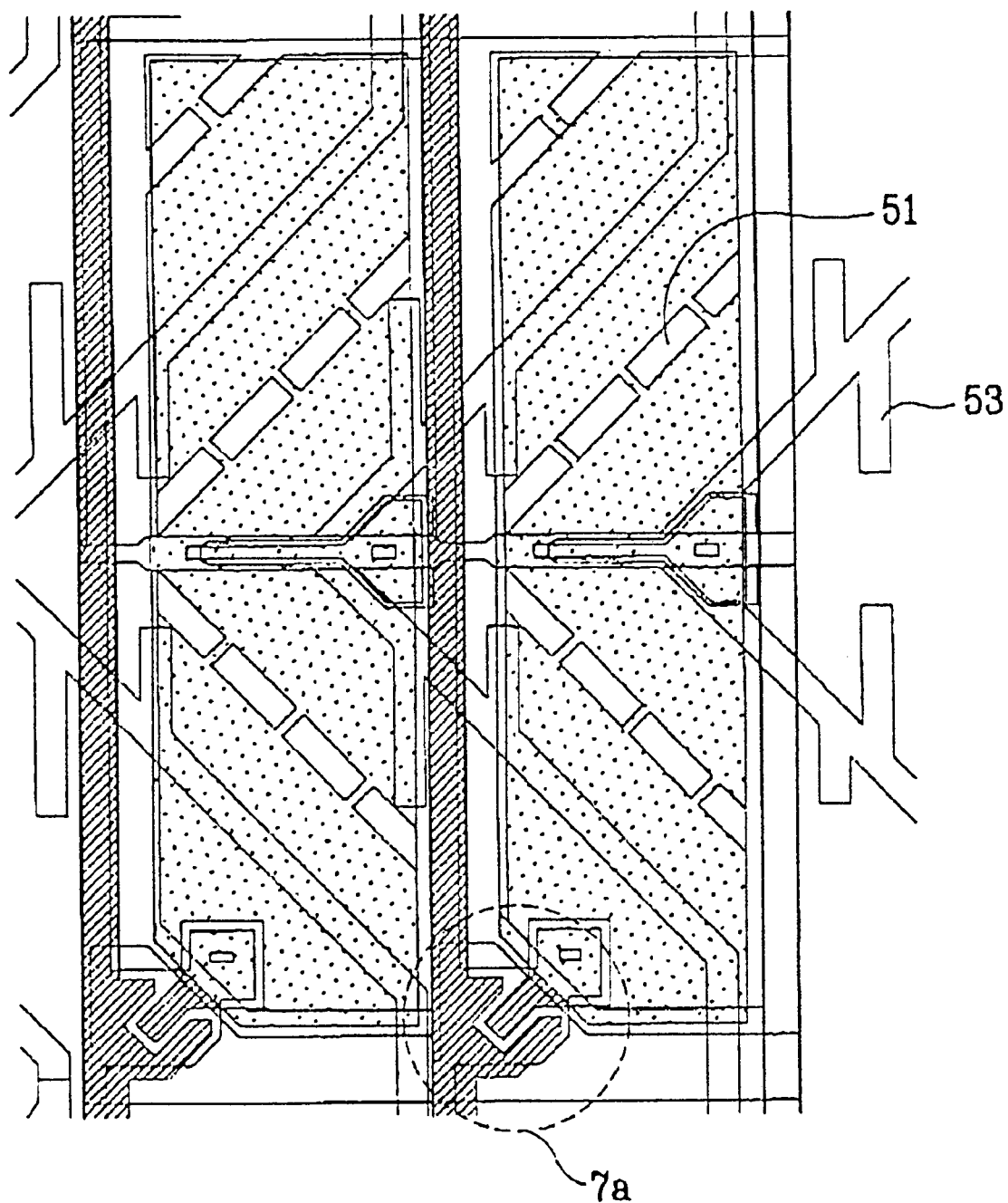
FIGS. 7A and 7B are plan views showing a multi-domain liquid crystal display device according to the first embodiment of the present invention.
Figure 7B:
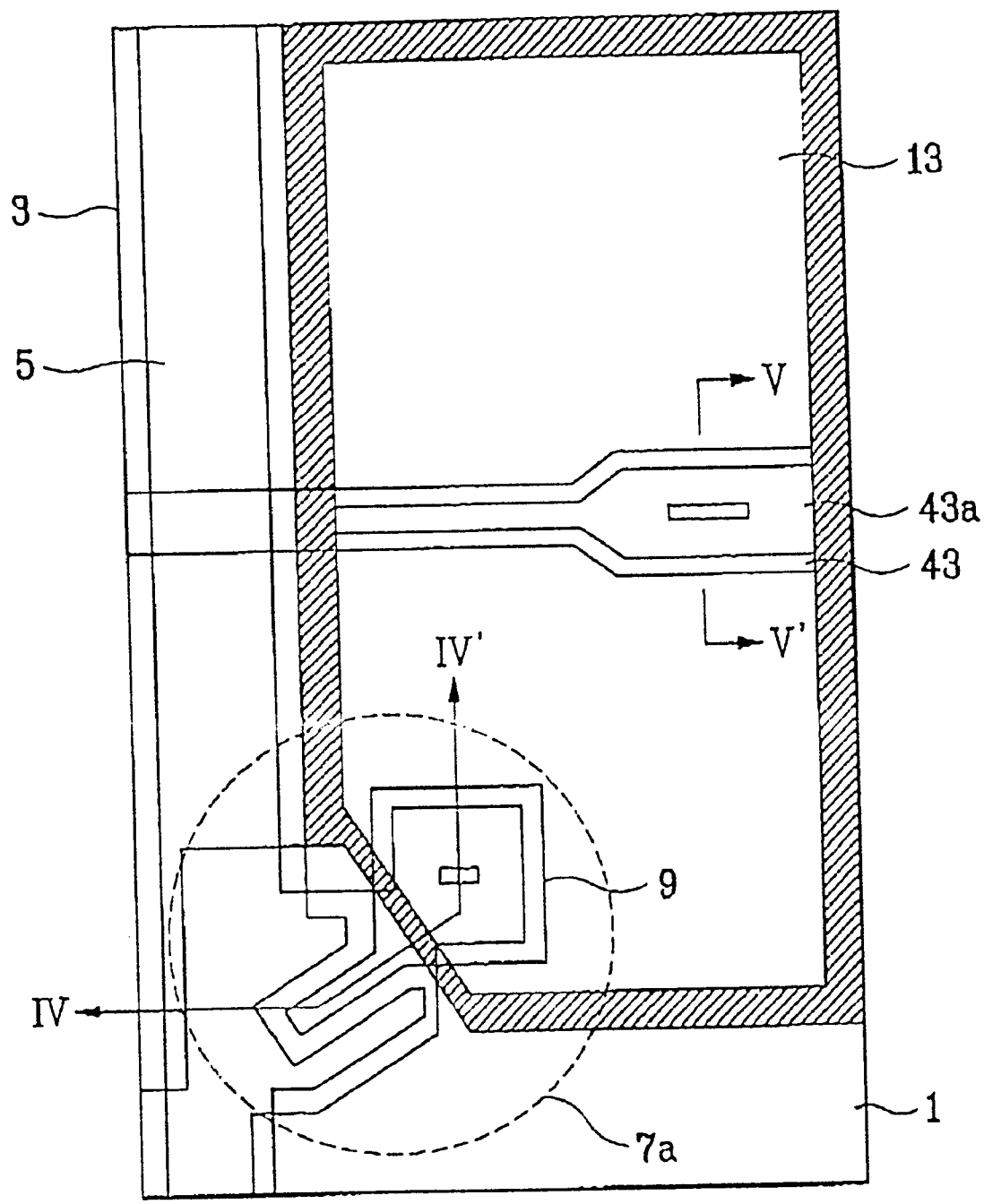

Also, the thin film transistor may be formed in a U-shape. Namely, the U-shaped thin film transistor 7a having the source electrode which surrounds the drain electrode may be formed in a portion where the gate lines cross the data lines, as shown in FIGS. 7A and 7B. FIG. 7B is an enlarged view of a single pixel region having a U-shaped TFT.

As shown in FIG. 7A, the dielectric structure 53 is patterned in a zig-zag shape. A plurality of electric field induction windows 51 are formed within the pixel region, and a projection is formed in the dielectric structure 53 at a boundary portion, bending portion or corner portion, or crossing portion of the pixel region.

Figure 8A:
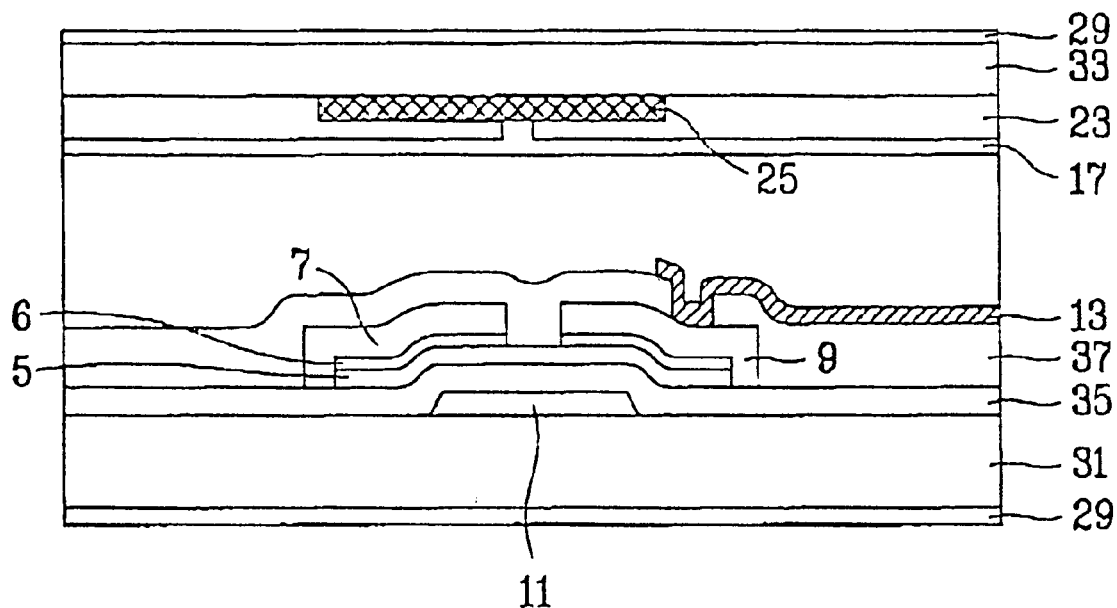
FIGS. 8A and 8B are sectional views showing a multi-domain liquid crystal display device, taken along lines IV–IV' and V–V' of FIG. 7B.
Figure 8B:
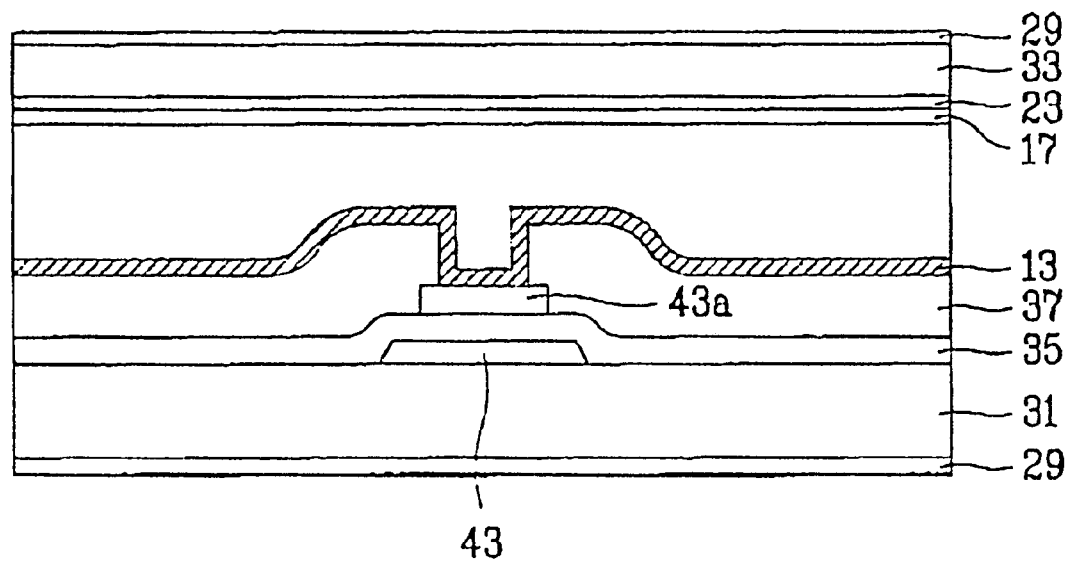
Figure 9A:
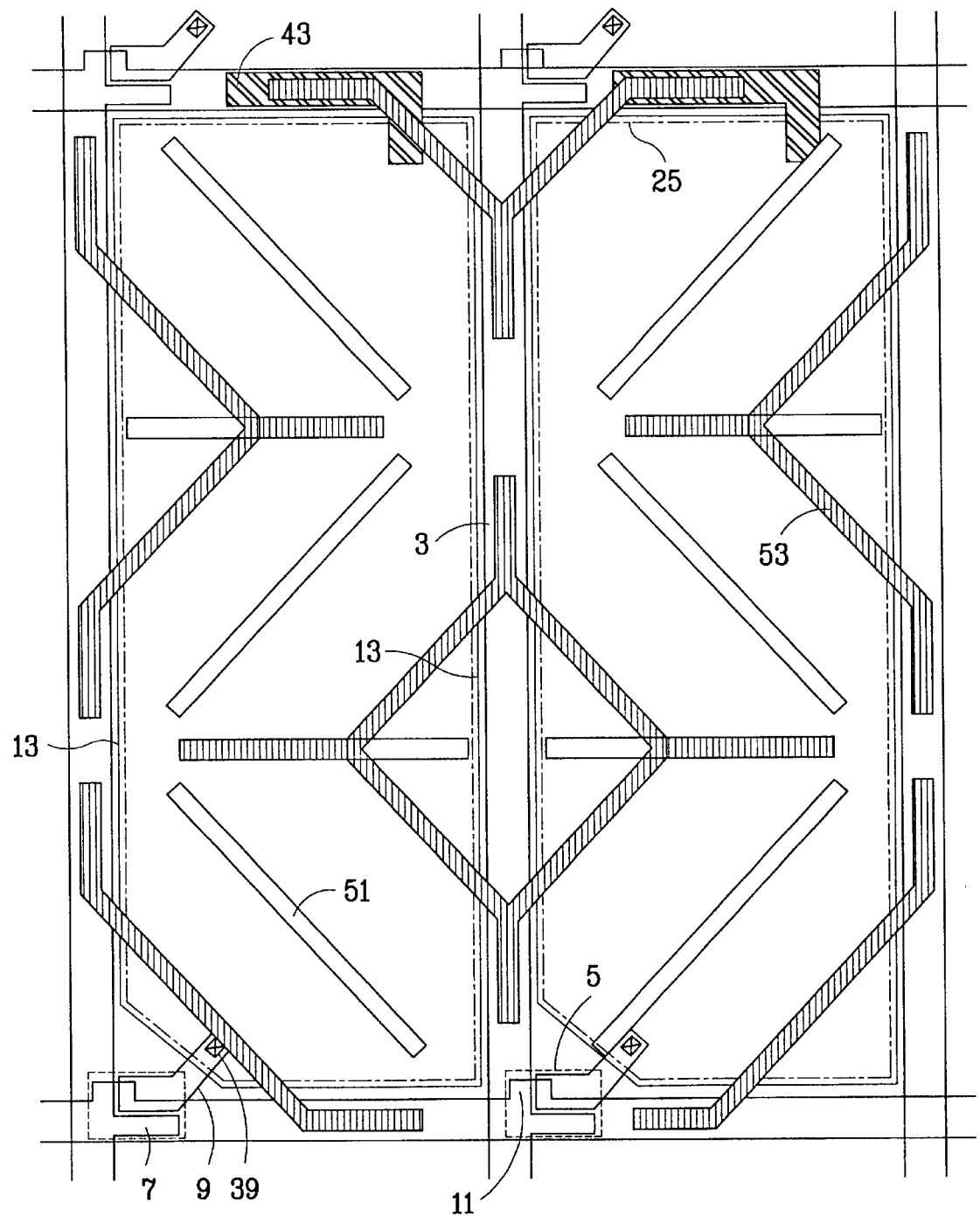
FIGS. 9A to 9C are plan views showing a multi-domain liquid crystal display device according to the second embodiment of the present invention.
Figure 9B:
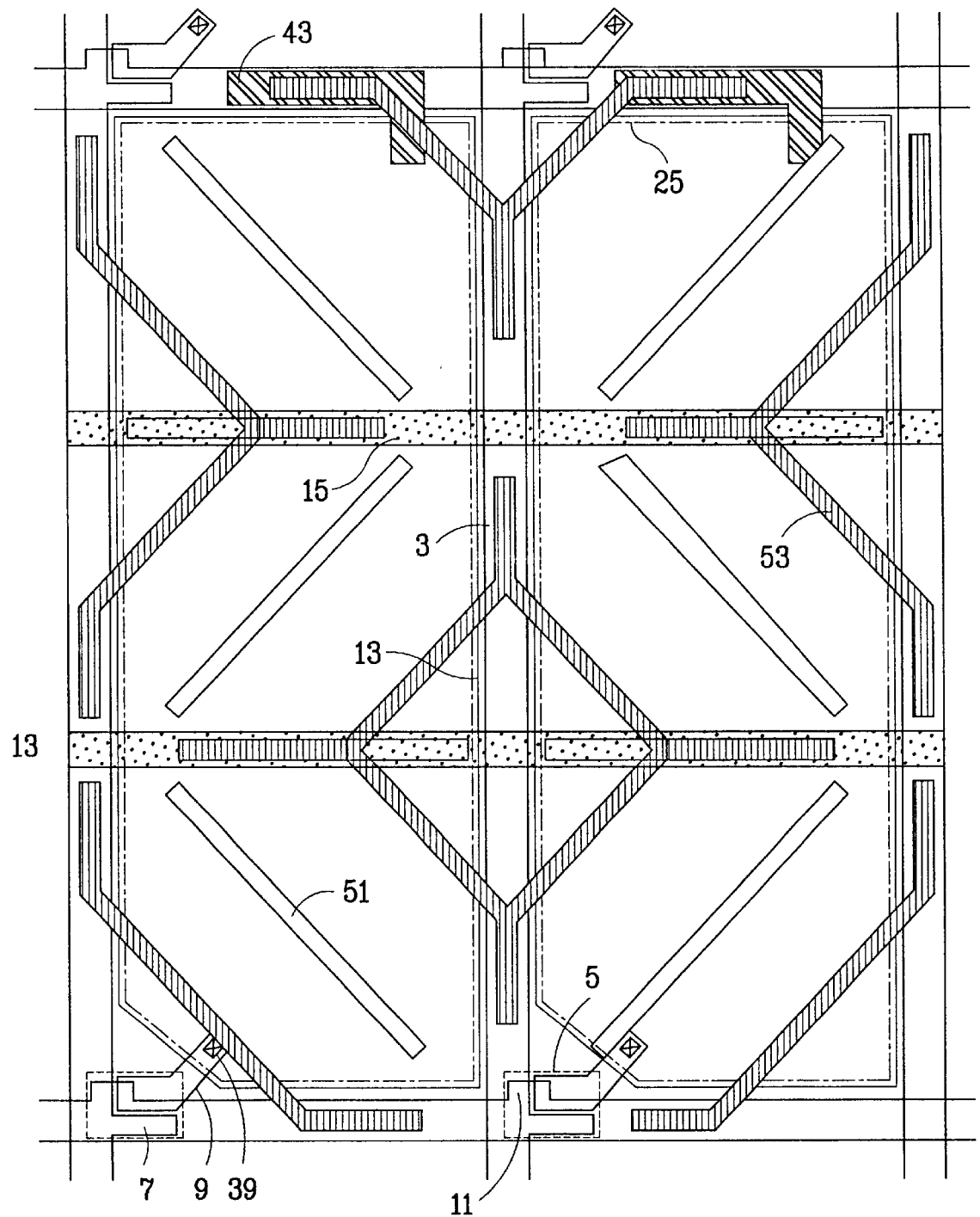
Figure 9C:
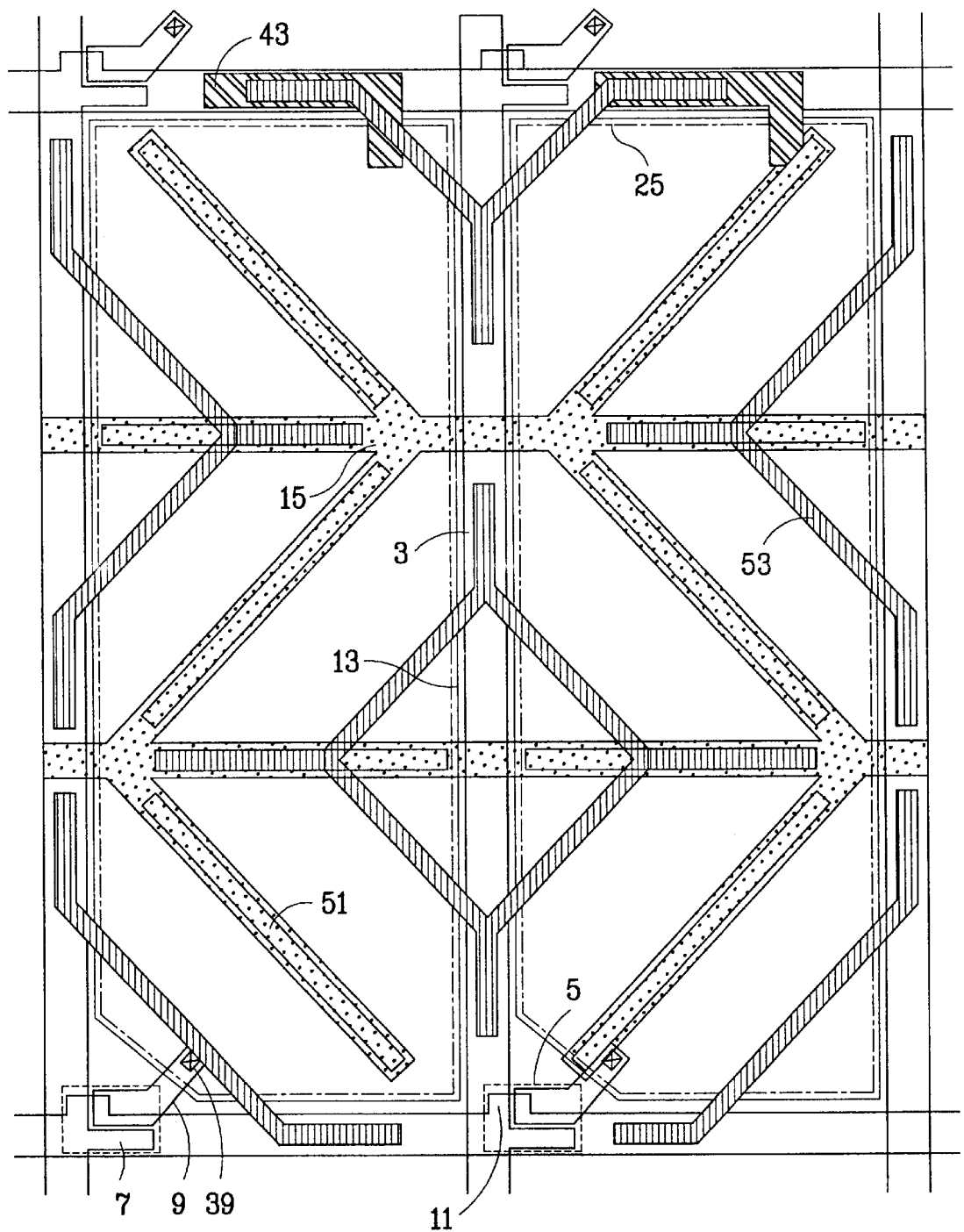
Figure 10A:
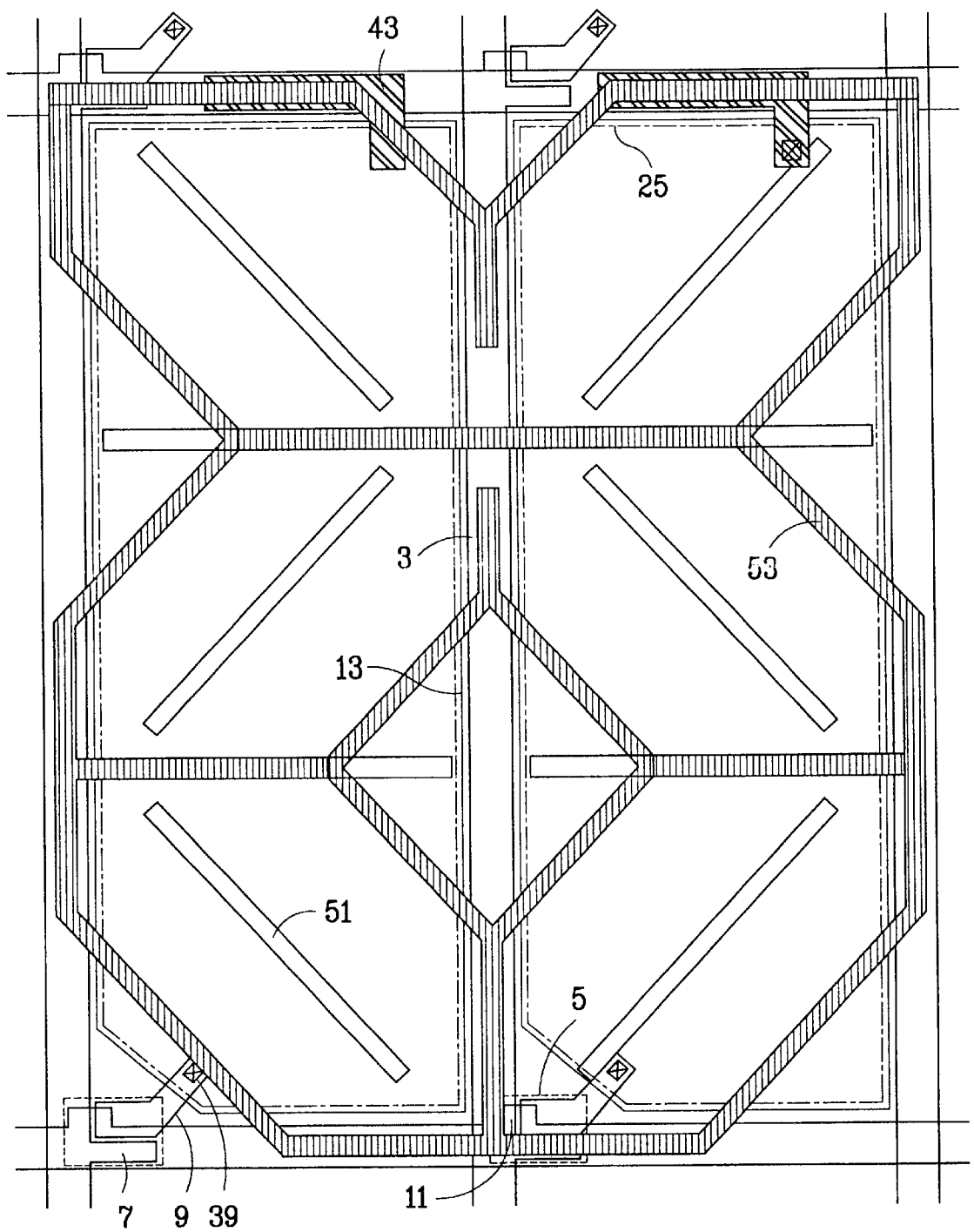
FIGS. 10A to 10C are plan views showing a multi-domain liquid crystal display device according to the third embodiment of the present invention.
Figure 10B:
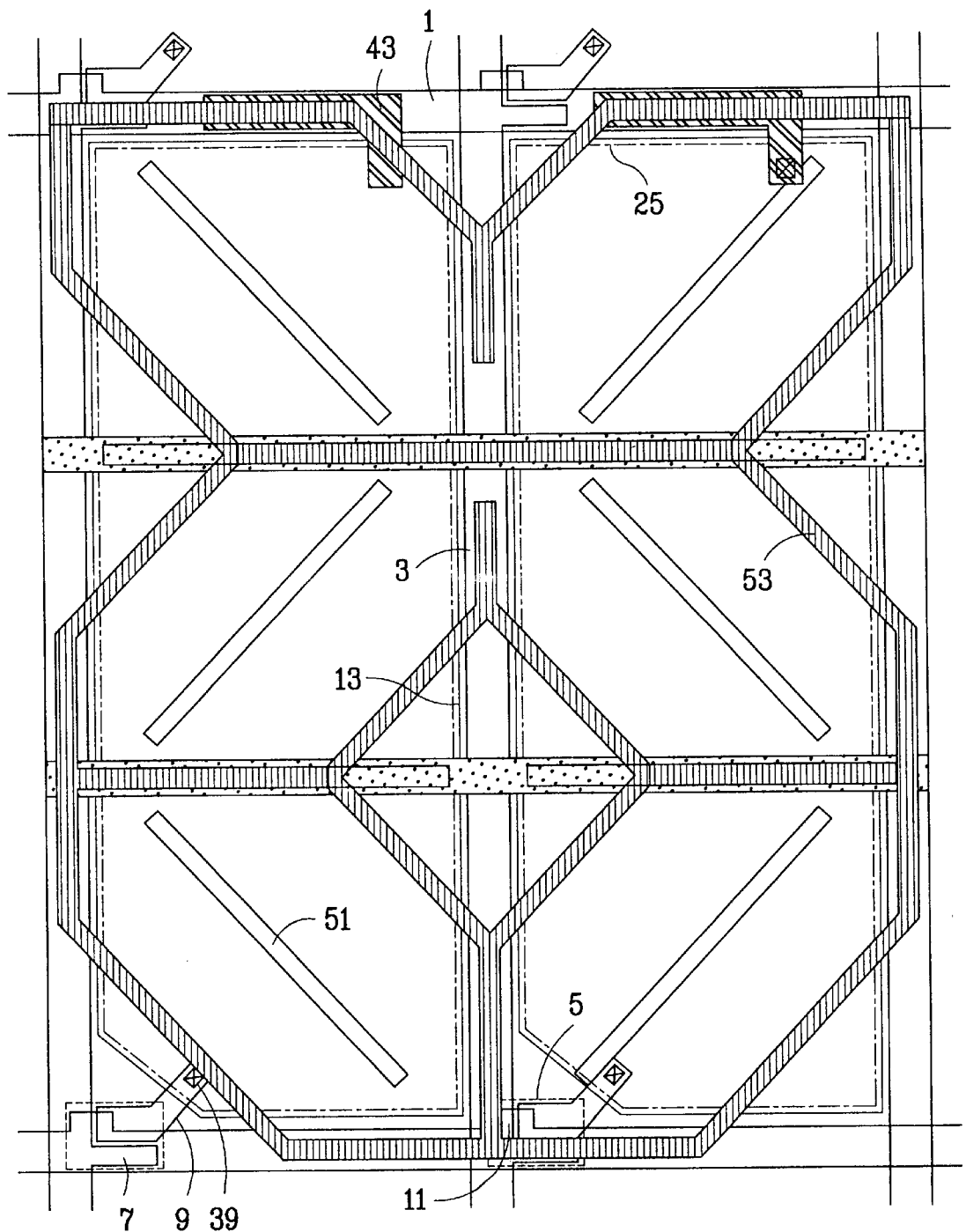
Figure 10C:
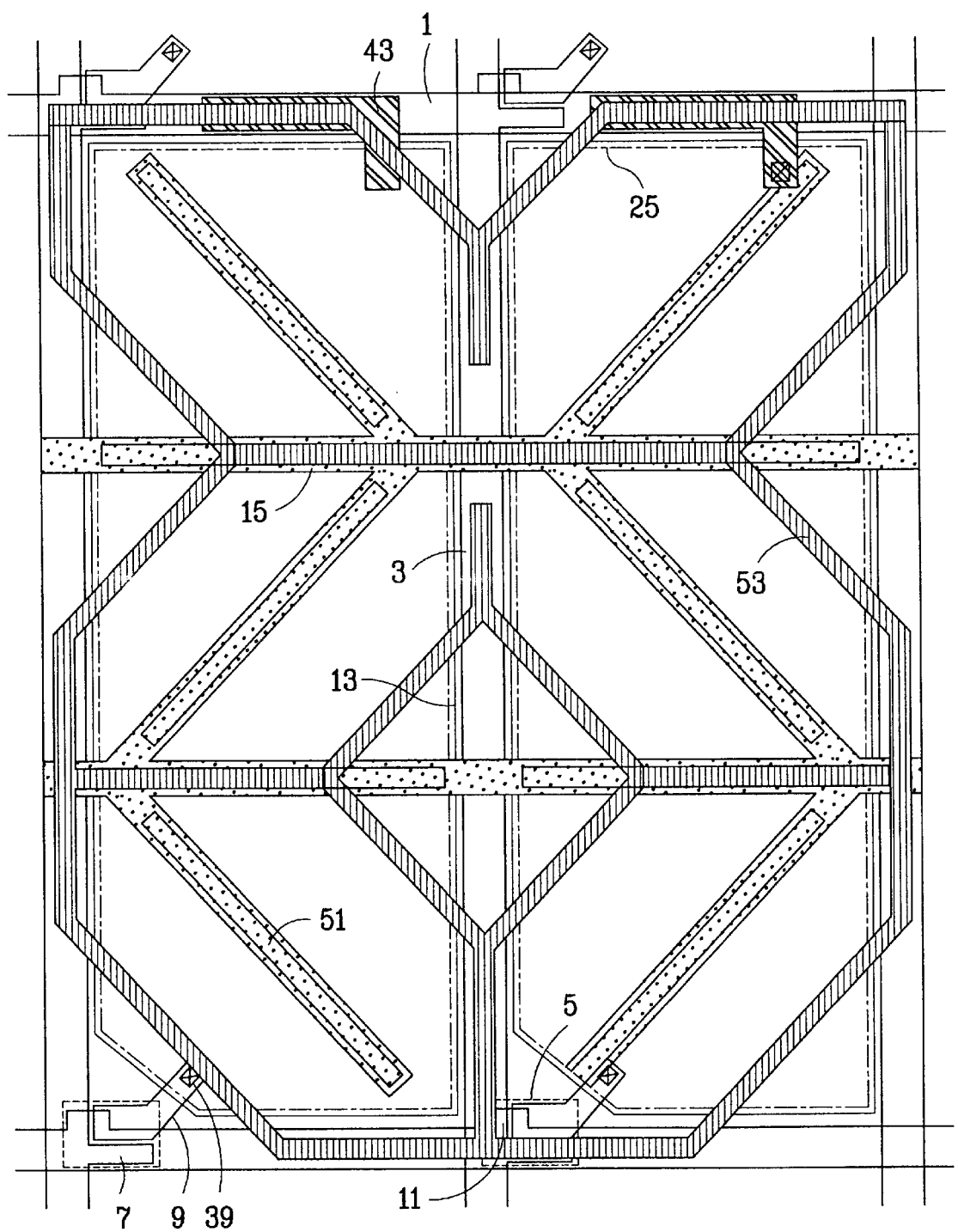
Figure 11A:
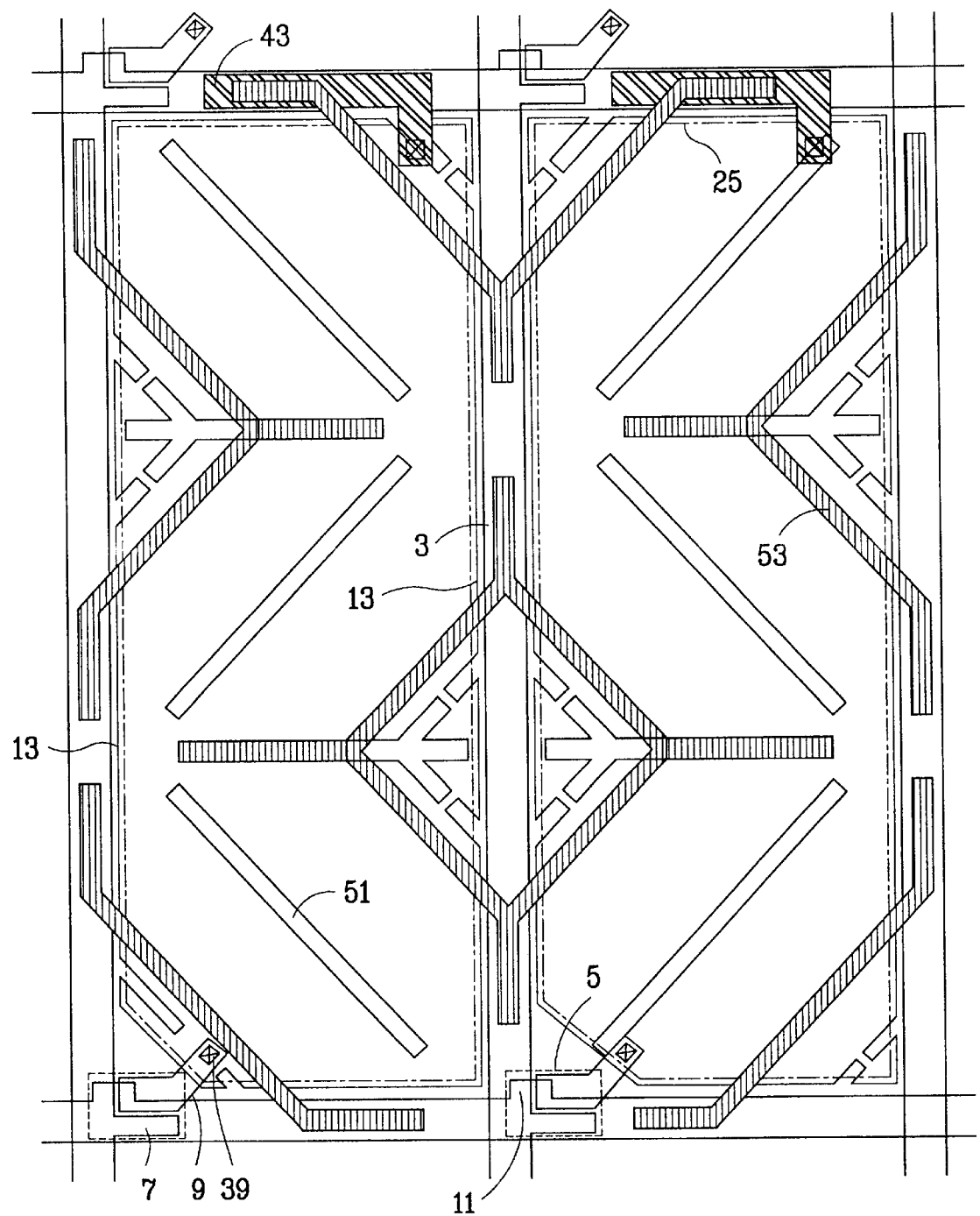
FIGS. 11A to 11C are plan views showing a multi-domain liquid crystal display device according to the fourth embodiment of the present invention.
Figure 11B:
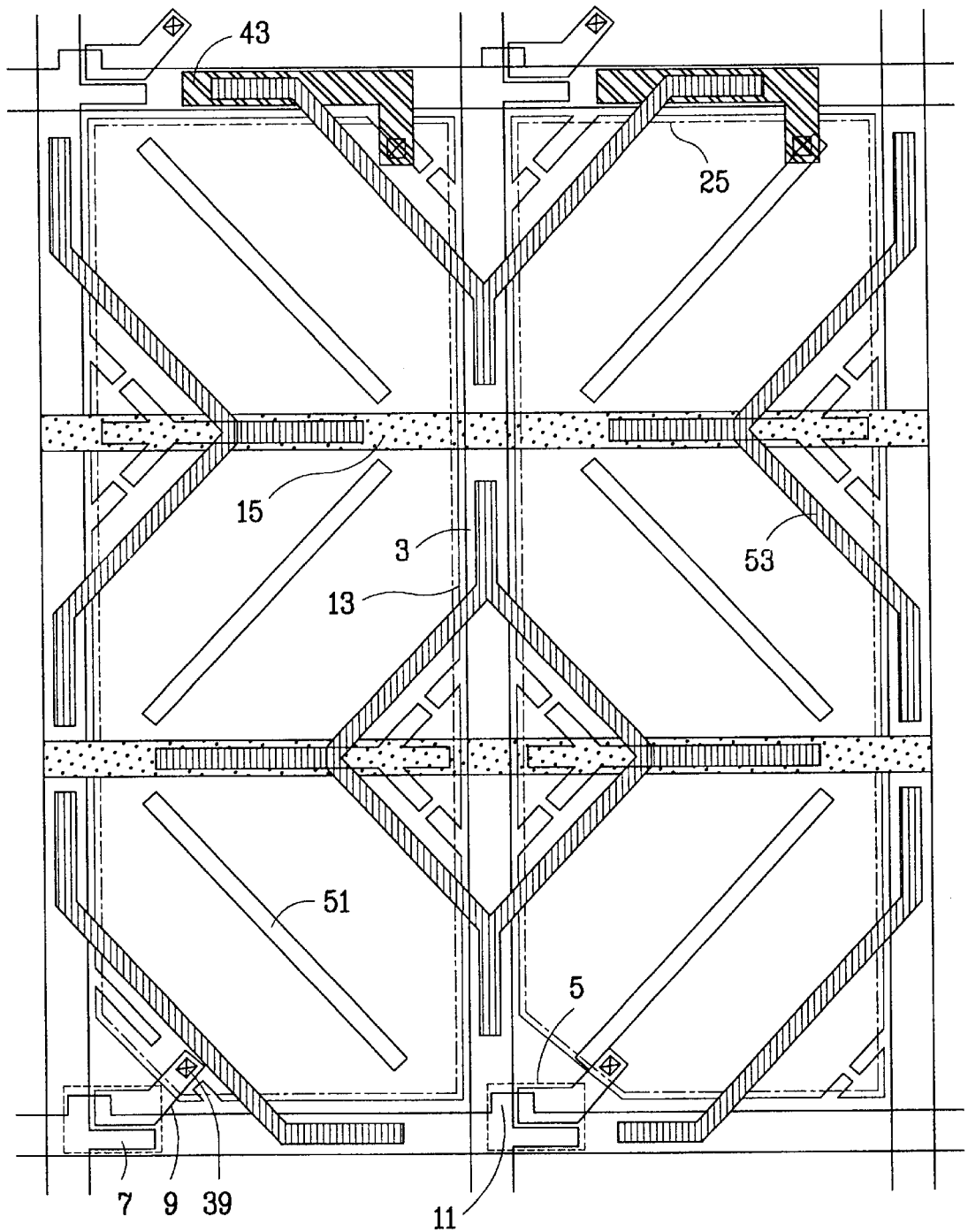
Figure 11C:
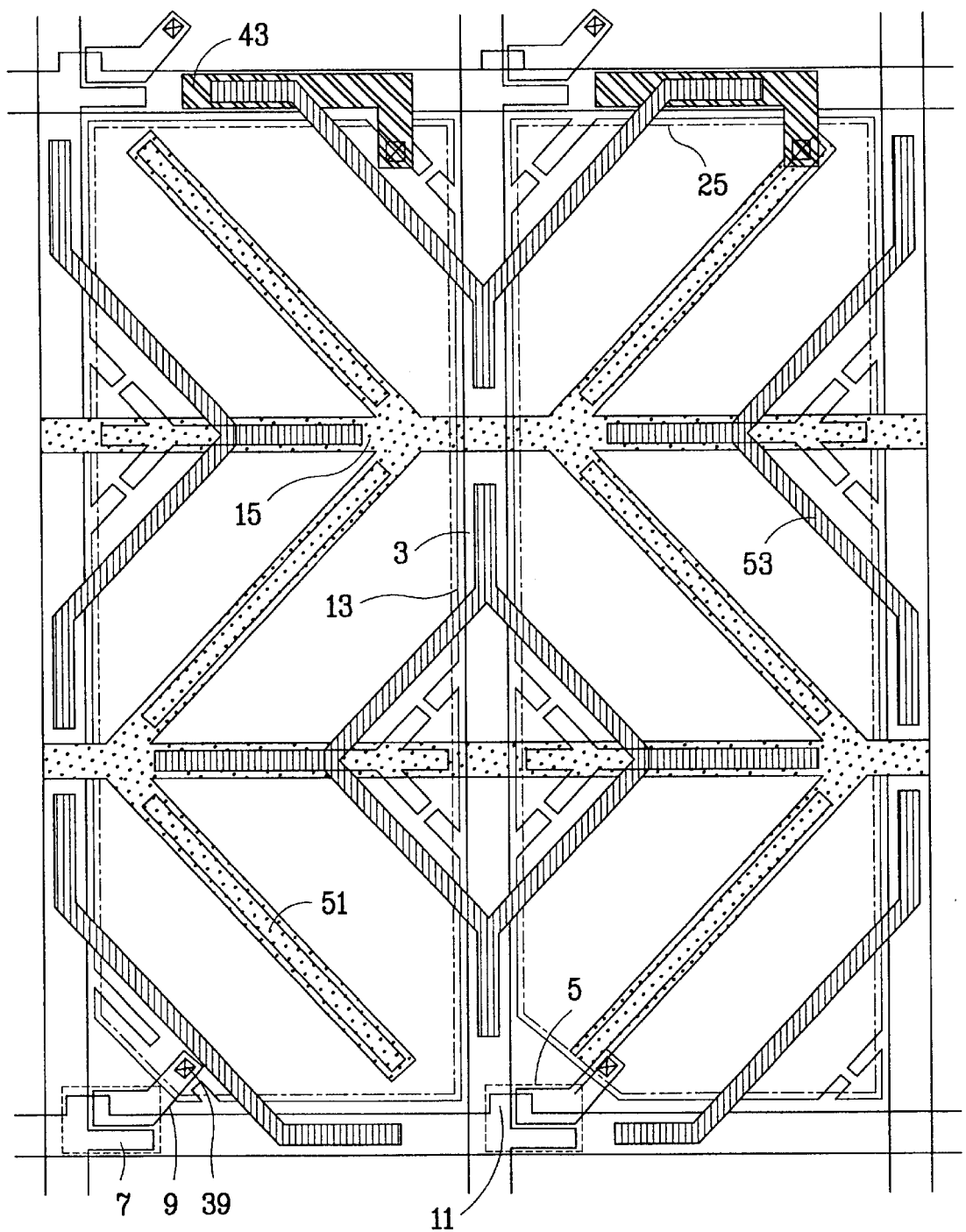
Figure 12A:
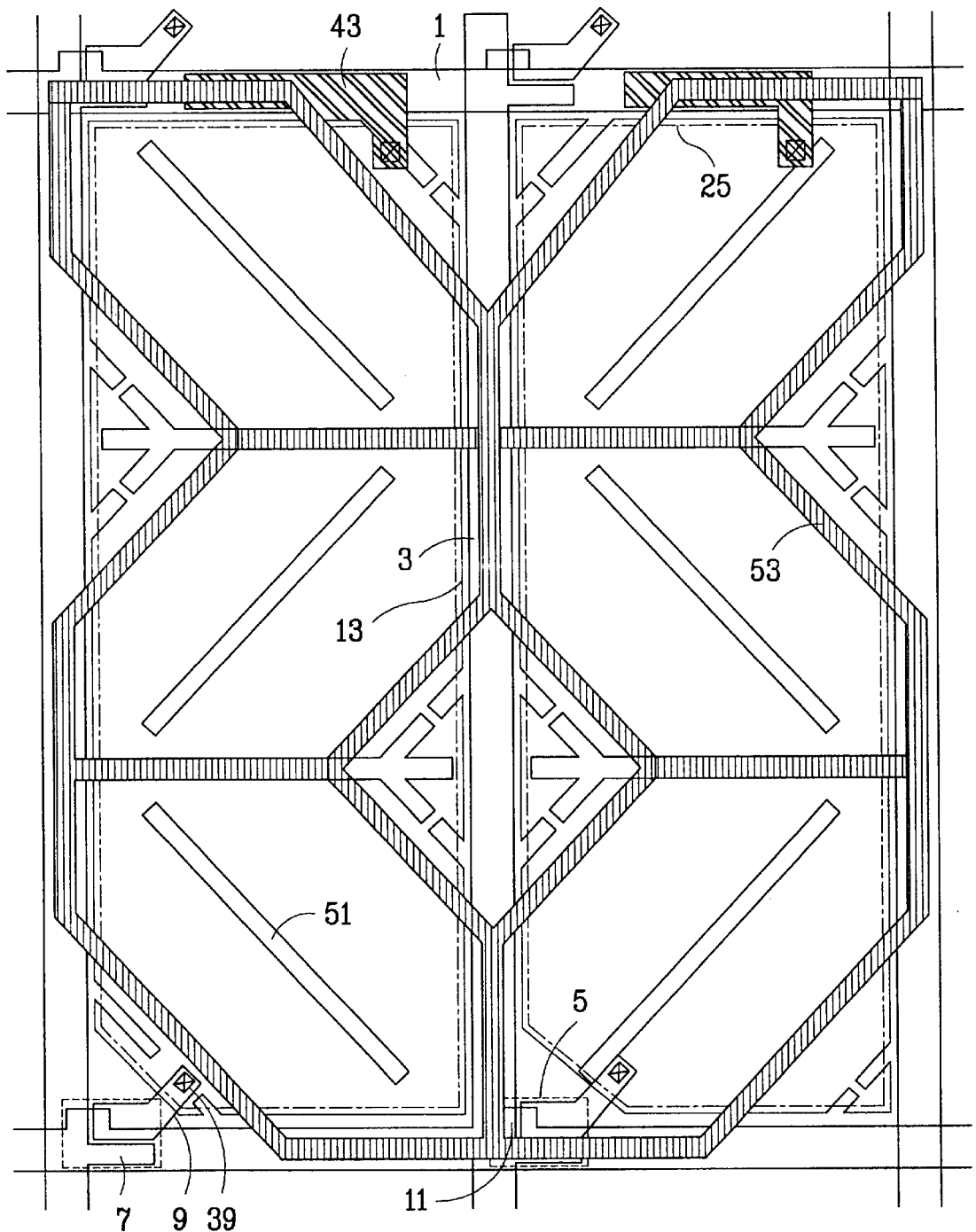
FIGS. 12A to 12C are plan views showing a multi-domain liquid crystal display device according to the fifth embodiment of the present invention.
Figure 12B:
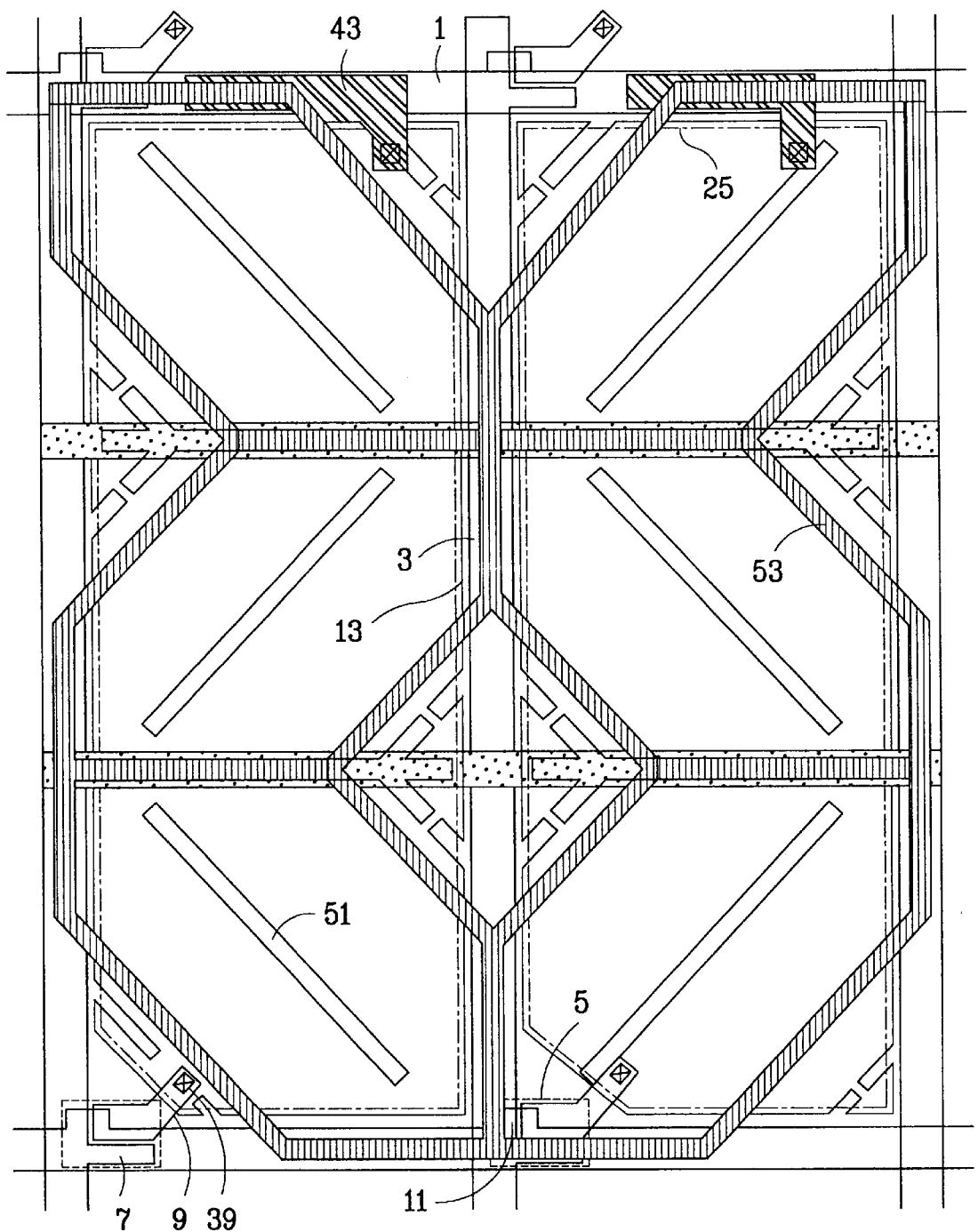
Figure 12C:
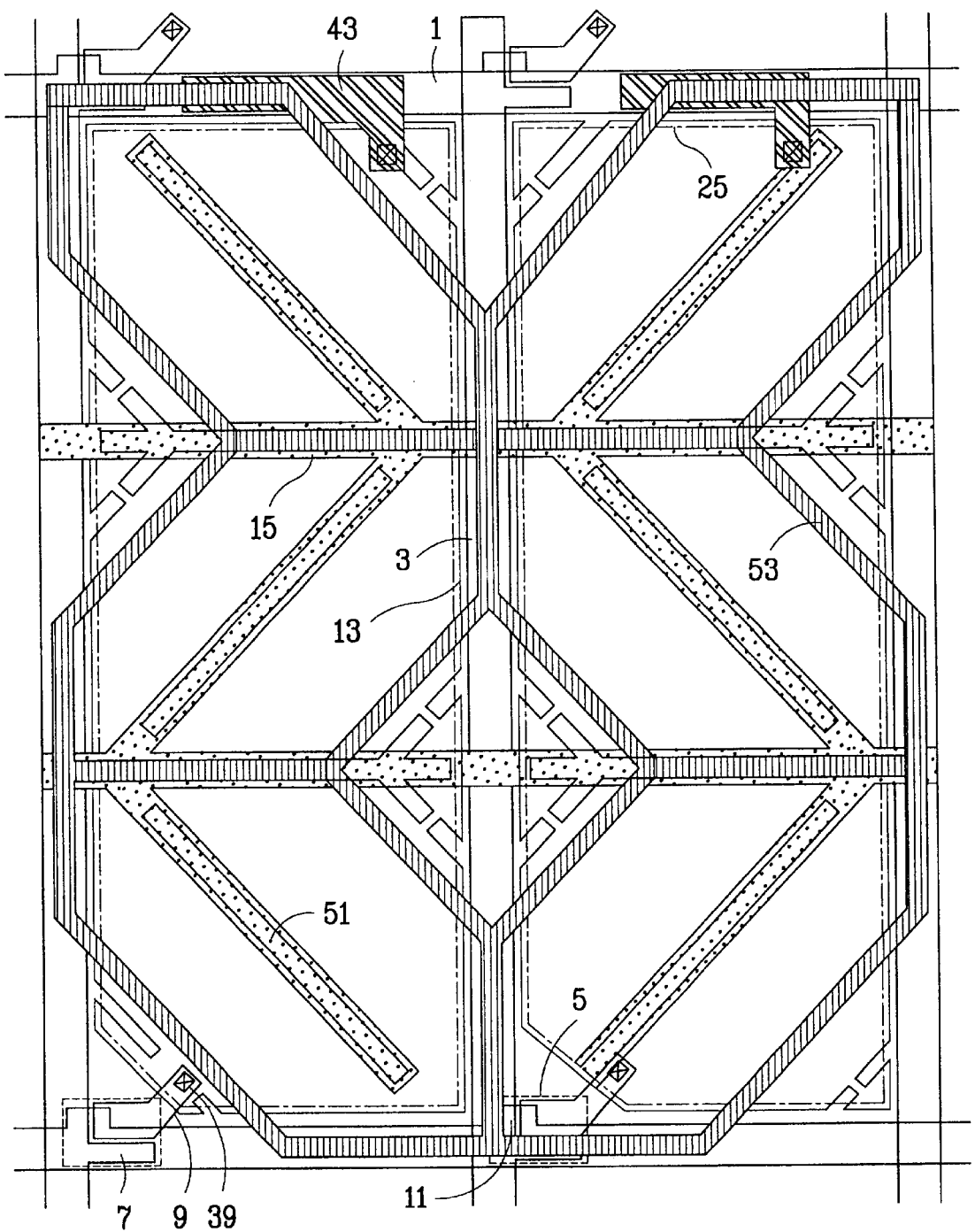
Figure 13A:
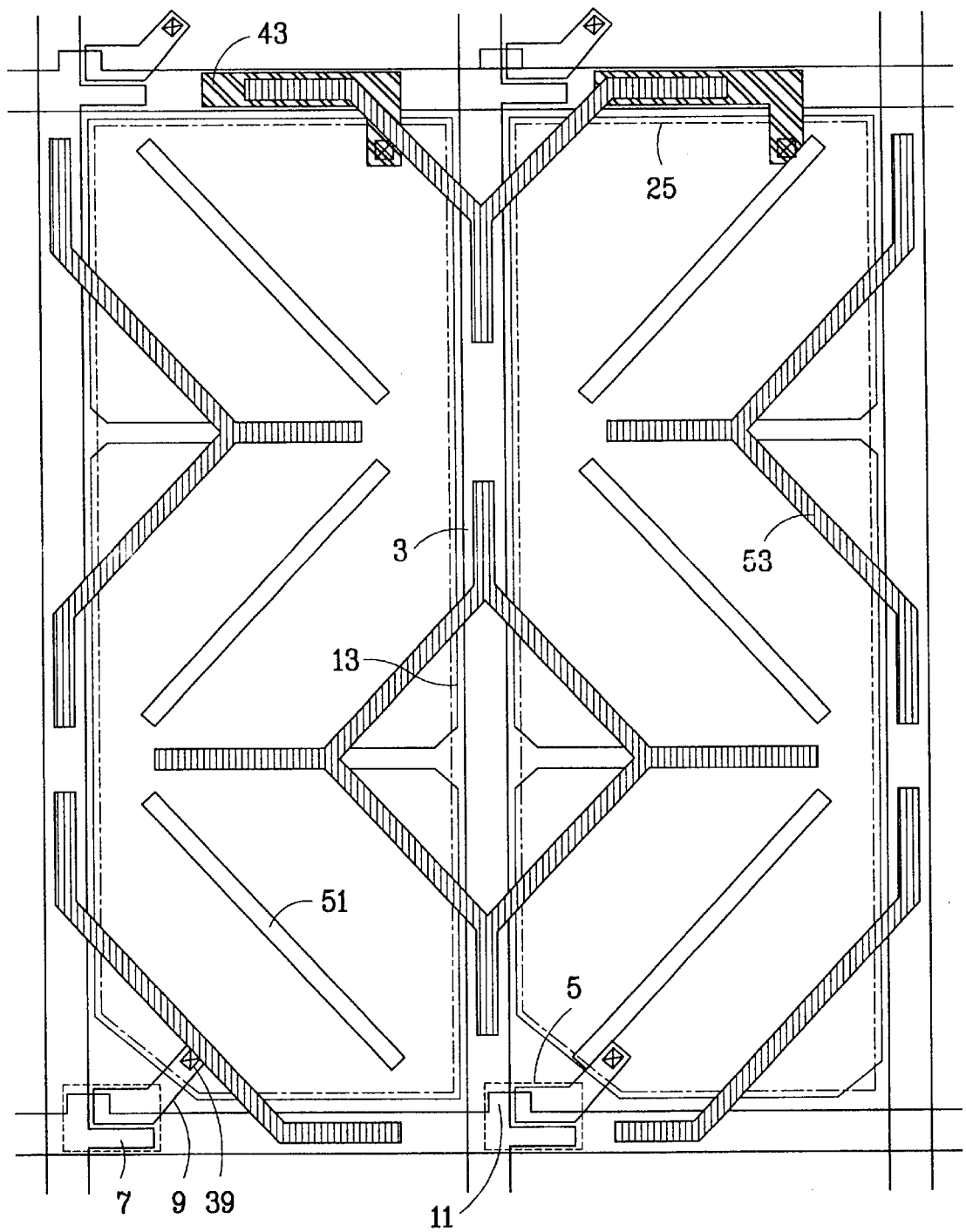
FIGS. 13A to 13C are plan views showing a multi-domain liquid crystal display device according to the sixth embodiment of the present invention.
Figure 13B:
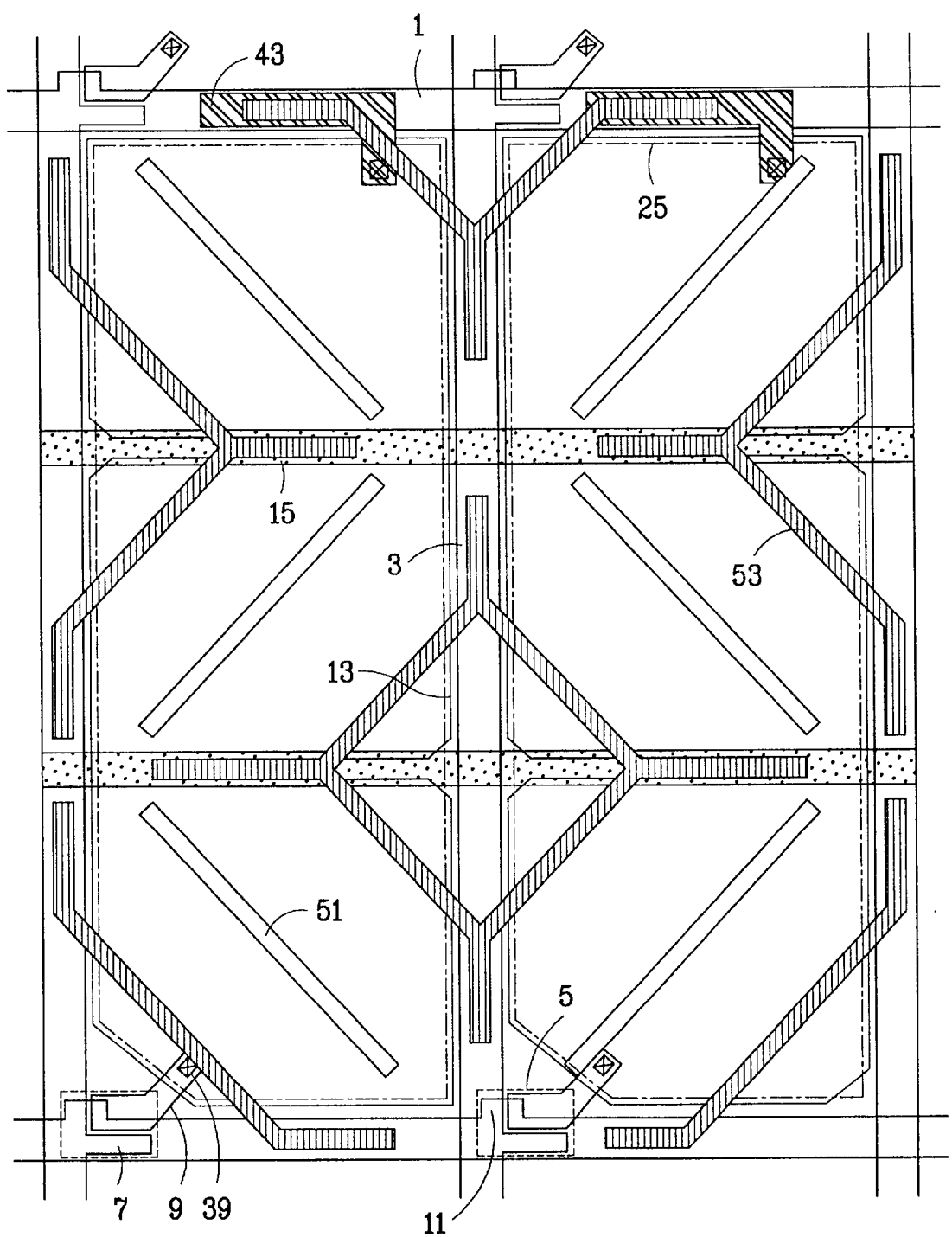
Figure 13C:
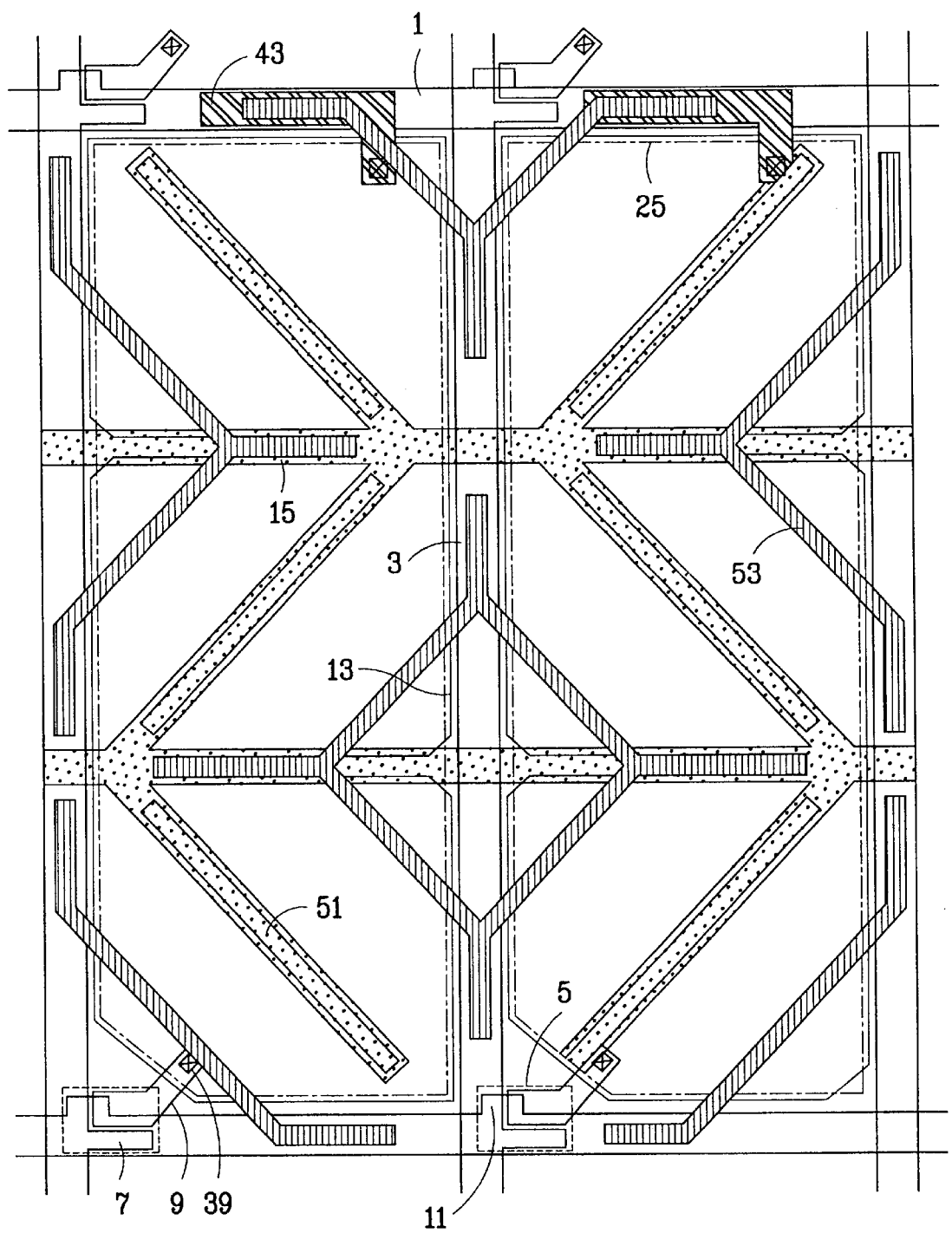
Figure 14A:
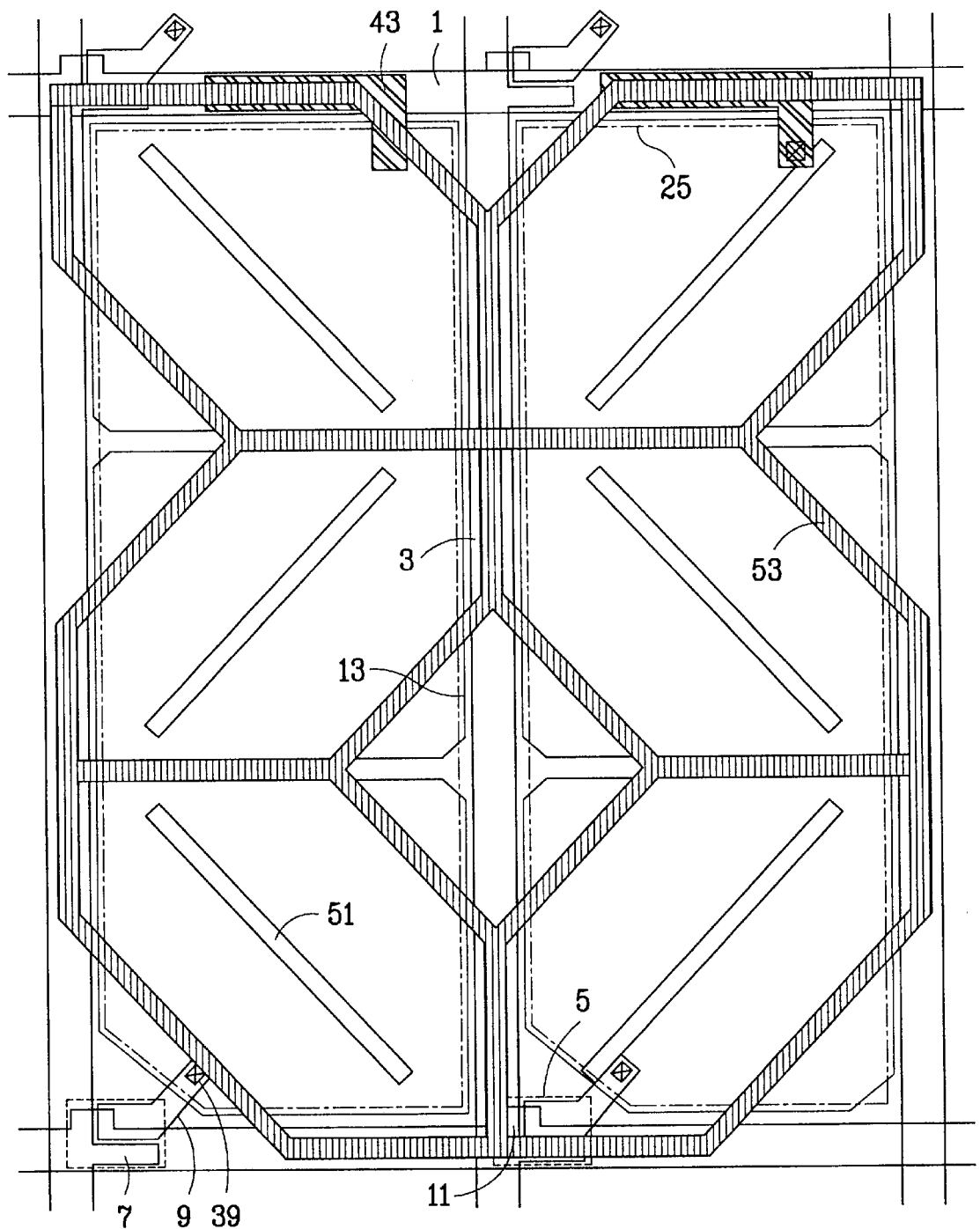
FIGS. 14A to 14C are plan views showing a multi-domain liquid crystal display device according to the seventh embodiment of the present invention.
Figure 14B:
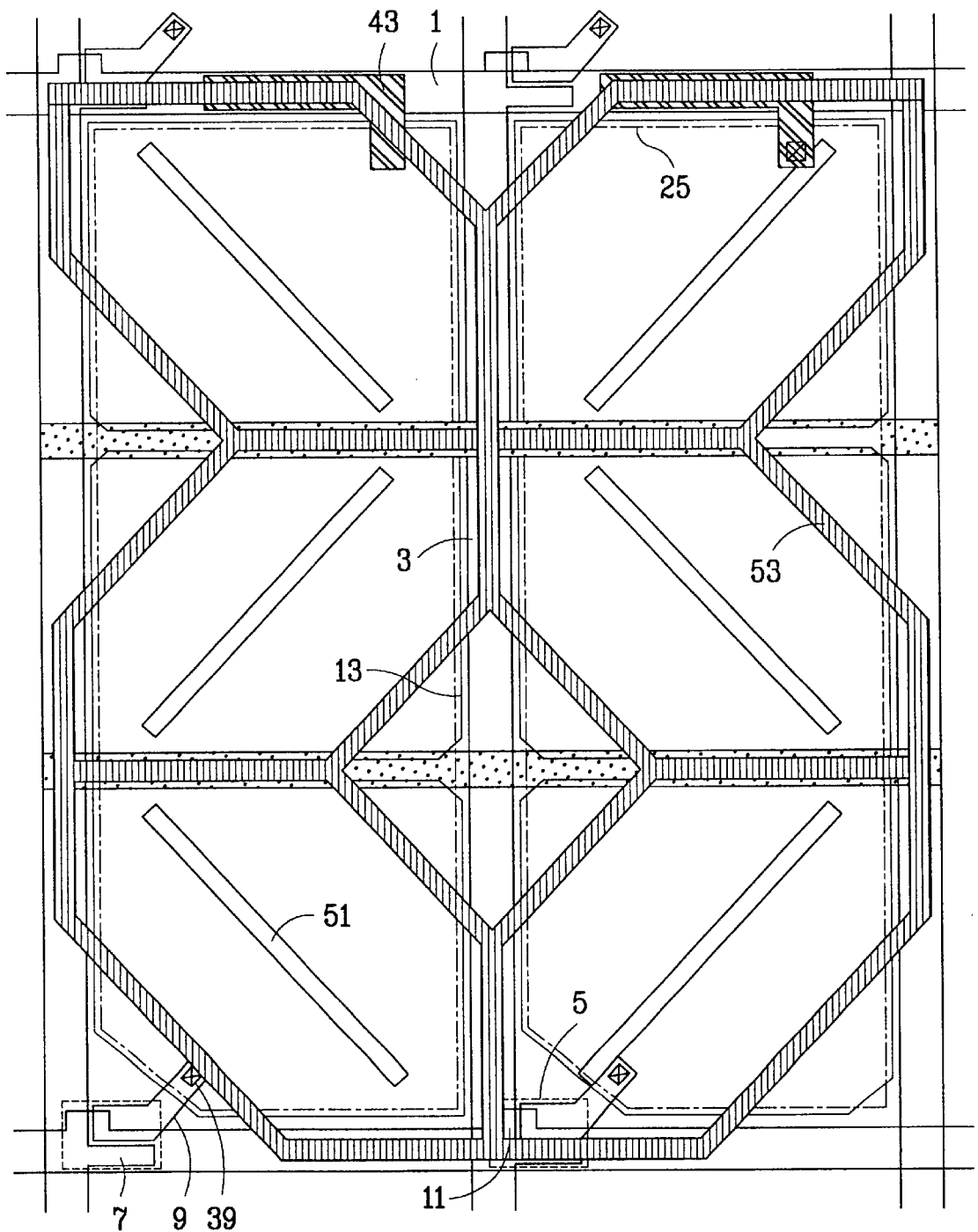
Figure 14C:
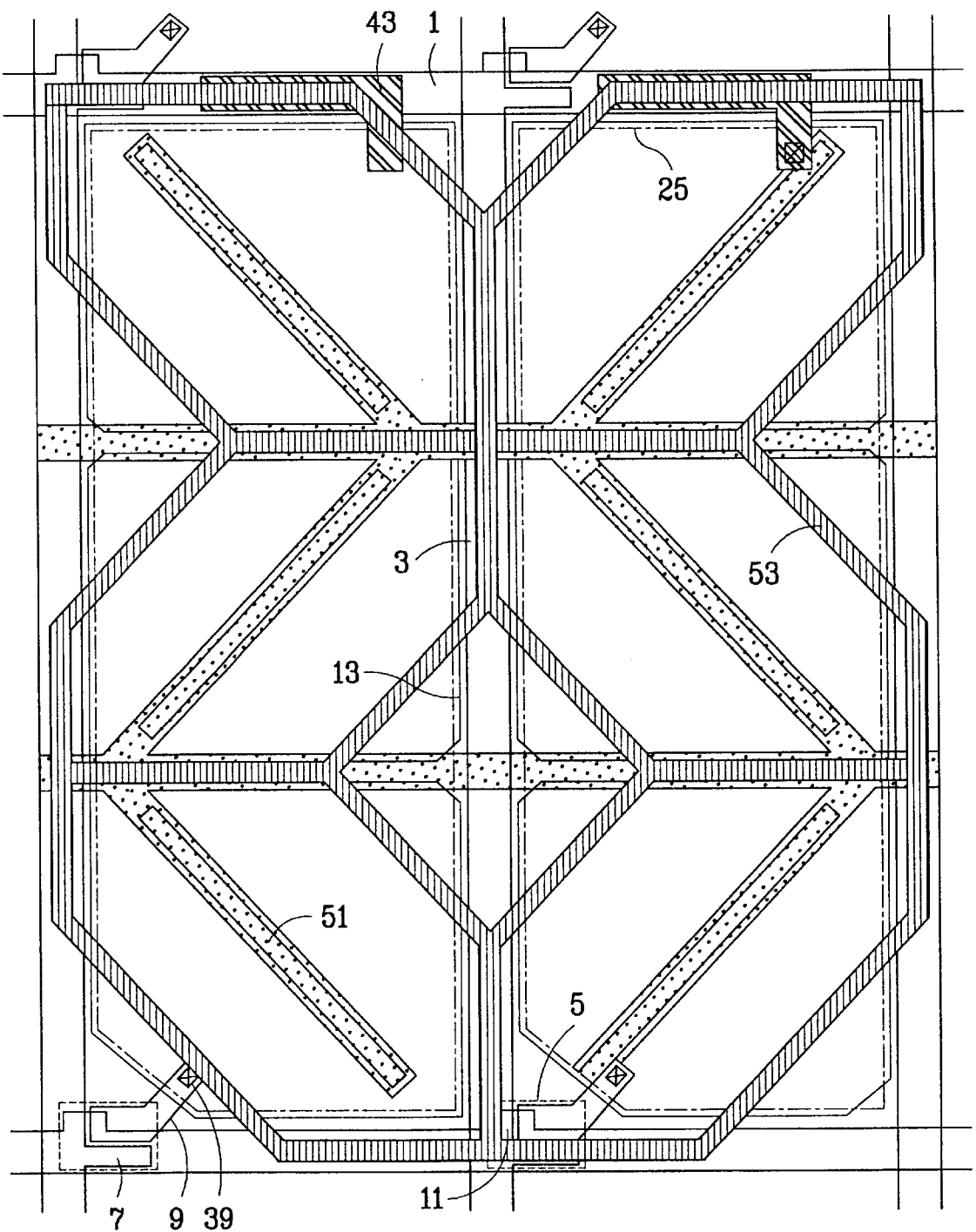

Meanwhile, FIG. 8A is a sectional view taken along line IV–IV' of FIG. 7B, and FIG. 8B is a sectional view taken along line V–V'. A metal such as Al, Mo, Cr, Ta, or Al alloy is formed on the first substrate 31 by sputtering method. The metal is then patterned to form the gate lines 1, the gate electrodes 11, and a first electrode 43 of a storage capacitor. A gate insulating film 35 of silicon nitride or silicon oxide is formed on the entire surface of the substrate including the gate electrode 11 by plasma CVD.

At this time, to improve aperture ratio, the gate insulating film may be formed of BCB, acrylic resin or polyimide compound.

Afterwards, an amorphous silicon layer and n+ amorphous silicon layer are stacked on the gate insulating film 35 and then patterned to form a semiconductor layer 5 and an ohmic contact layer 6. Alternatively, the gate insulating film of silicon nitride or silicon oxide, the amorphous silicon layer, and n+ amorphous silicon layer may be sequentially deposited, and the amorphous silicon layer and the n+ amorphous silicon layer may be patterned to form the semiconductor layer 5 and the ohmic contact layer 6.

A metal such as Al, Mo, Cr, Ta, or Al alloy is formed by sputtering method and then patterned to form the data lines in a direction crossing the gate lines, the drain electrode 9 of the thin film transistor, the source electrode 7 surrounding the drain electrode 9, and a second electrode 43a of the storage capacitor.

Subsequently, the passivation film 37 of BCB, acrylic resin, polyimide compound, silicon nitride, or silicon oxide is formed on the entire surface including the source/drain electrodes 7 and 9 and the second electrode 43a of the storage capacitor. A transparent conductive material such as ITO is formed and then patterned to form the pixel electrode 13 with the electric field induction window 51 having a plurality of hole or silt shapes within each domain.

As described above, problems related to flicker and residual images can be solved by forming the thin film transistor in a U shape.

As shown in FIG. 8A, the light-shielding layer 25 is formed on the second substrate 33, and the color filter layer 23 is formed to repeat R(red), G(green) and B(blue) elements for each pixel. The common electrode 17 is formed of a transparent electrode such as ITO on the color filter layer 23, in the same manner as the pixel electrode 13. A photoresist material is deposited on the common electrode 17 and patterned by photolithography to form dielectric structures 53 having various shapes. Additionally, the alignment film (not shown) may be formed on the dielectric structures 53.

Subsequently, a liquid crystal is injected between the first substrate 31 and the second substrate 33 so that a multidomain liquid crystal display device is completed. The liquid crystal has a positive dielectric anisotropy or a negative dielectric anisotropy. The liquid crystal may have a chiral dopant.

The liquid crystal is injected by dispenser method. Namely, a seal pattern for bonding two substrates is formed on the first substrate 31, and the liquid crystal is injected into the seal pattern by the dispenser method.

After a spacer is distributed on the second substrate 33 to uniformly maintain the cell gap of the liquid crystal, the first substrate 31 in which the seal pattern is formed and the second substrate 33 are bonded to each other. The seal pattern is then hardened by applying ultraviolet only or ultraviolet and heat.

Meanwhile, to form the liquid crystal layer, in addition to a method for placing the liquid crystal in a decompressed state, after making the inside of the cell in vacuum state, using the resultant pressure difference (capillary phenomenon) the liquid crystal may be entered into the cell. Alternatively, a generally known method for injecting a liquid crystal may be applied. For reference, when the drop method is applied to a large sized substrate, it is possible to reduce the liquid crystal formation time. When the liquid crystal having a negative dielectric anisotropy is used, it is possible to improve injection time of the liquid crystal because viscosity of the liquid crystal is high. Also, a columned spacer may be used as the spacer, and a UV hardening type seal material, or a seal material that can be hardened at a room temperature may be used as a material of the seal pattern.

Preferably, the dielectric structures 53 have dielectric constants equal to or smaller than the liquid crystal layer, and more preferably 3 or below. A material such as photo-acrylate or BCB may be used as the dielectric structures.

To apply a voltage $V_{com}$ to the common auxiliary electrode 15, an Ag-Dotting portion is formed in each corner of a driving region of the liquid crystal display device on the first substrate 31, and the electric field is applied to the second substrate 33 to drive the liquid crystal by the potential difference between upper and lower substrates. The Ag-Dotting portion of each corner is connected with the common auxiliary electrode 15. Thus, the voltage $V_{com}$ is applied to the common auxiliary electrode 15. This process is performed when forming the common auxiliary electrode 15.

A phase difference film 29 is formed on at least one of the first substrate 31 and the second substrate 33 (see FIG. 15). In FIG. 15, reference number 47 indicates liquid crystal.

The phase difference film 29 is a negative uniaxial film having one axis and acts to compensate a viewing angle of a user.

Therefore, a region having no gray inversion is expanded, contrast ratio in incline direction increases, and a multi-domain is formed by one pixel. Thus, a viewing angle in left and right direction can effectively be compensated.

In addition to the negative uniaxial film, a negative biaxial film having two axes may be formed as the phase difference film. The negative biaxial film having two axes can obtain a viewing angle wider than the negative uniaxial film.

Furthermore, the uniaxial film 29 and the biaxial film 59 attached to each other may be formed as the phase difference film.

Figure 15A:
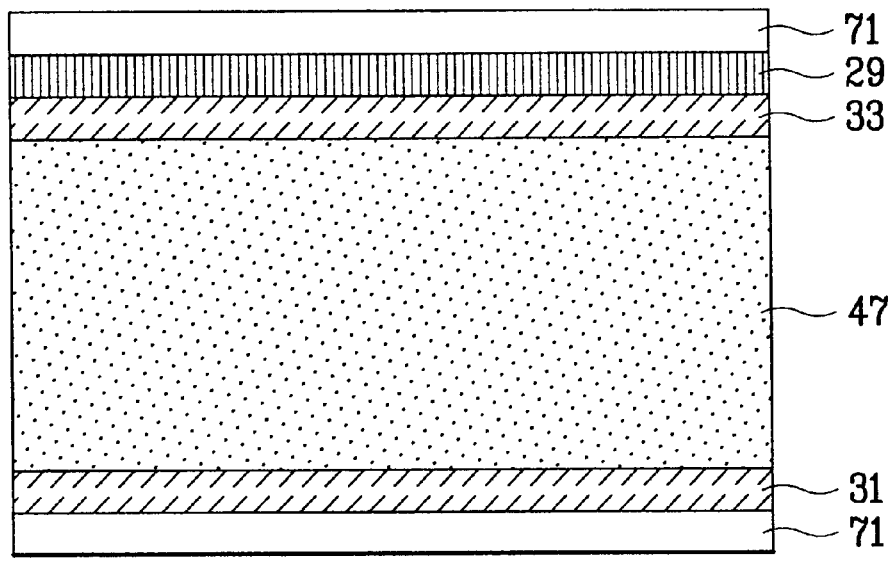
FIGS. 15A to 15J are sectional views showing a multi-domain liquid crystal display device according to the present invention.
Figure 15B:
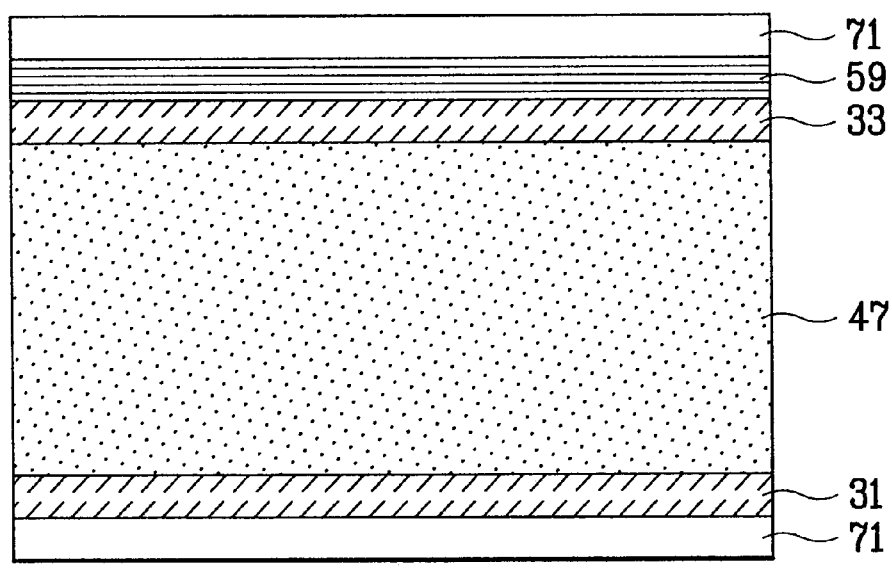
Figure 15C:
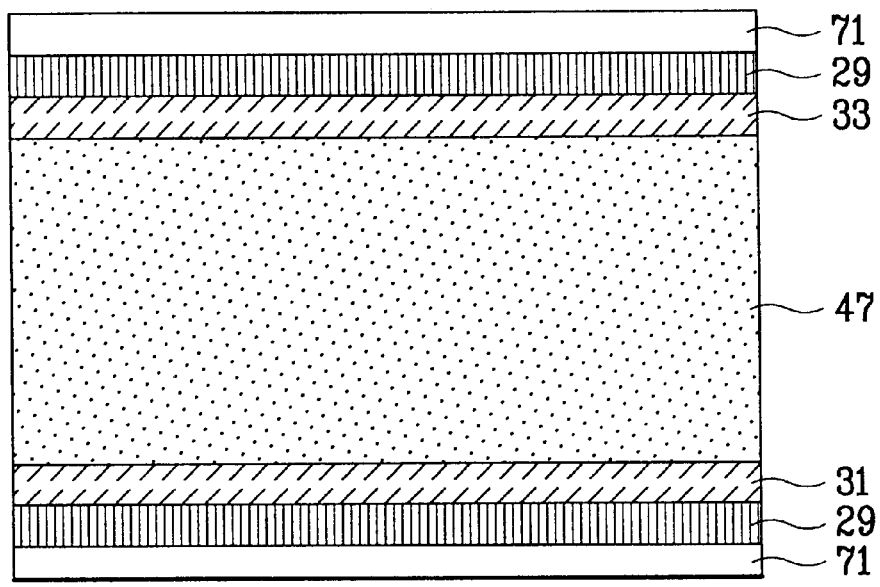
Figure 15D:
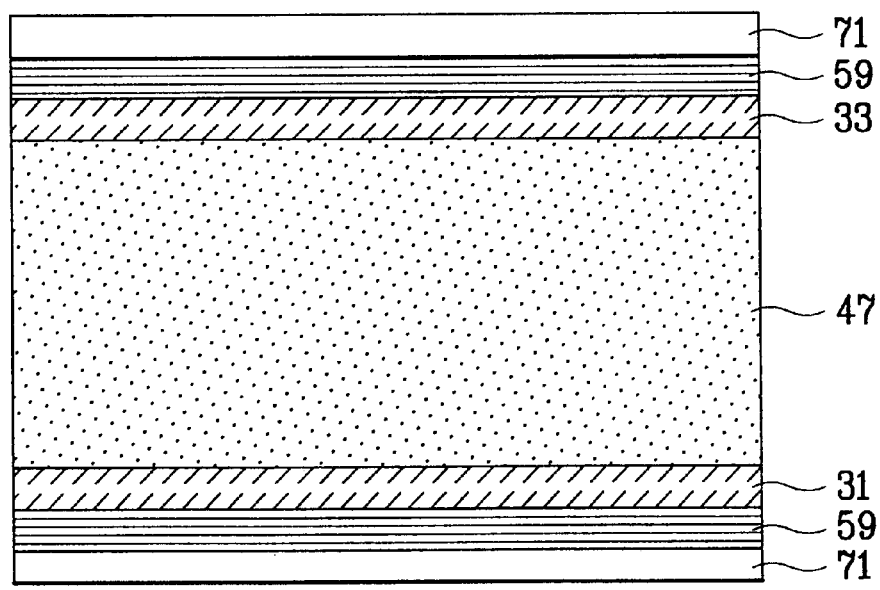
Figure 15E:
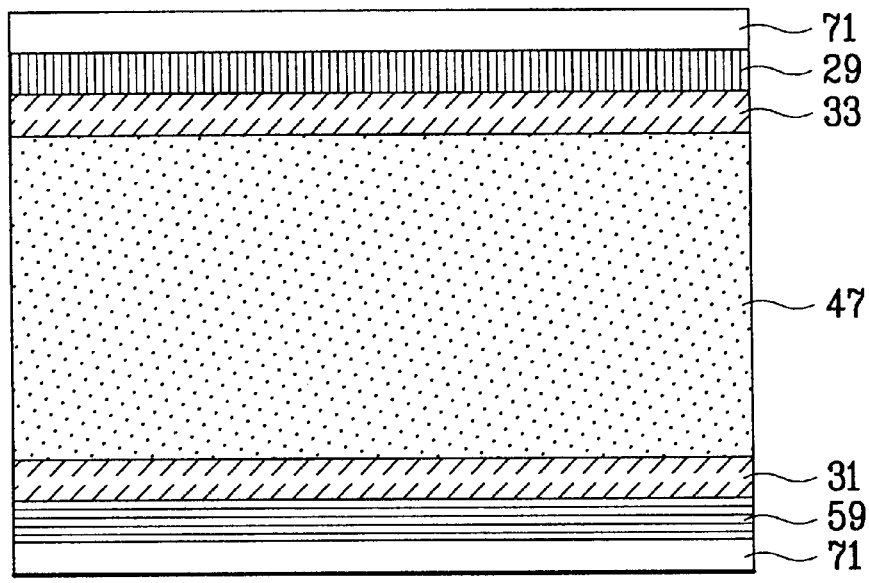
Figure 15F:
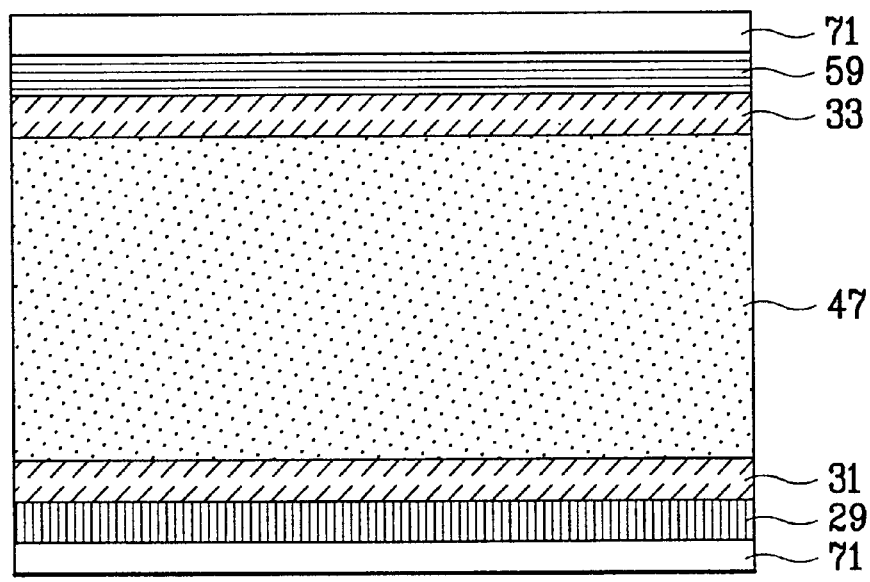
Figure 15G:
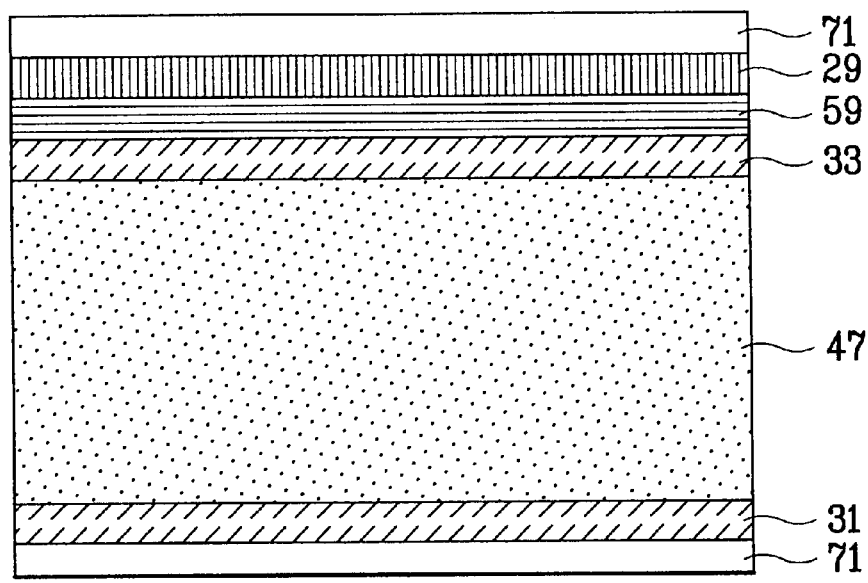
Figure 15H:
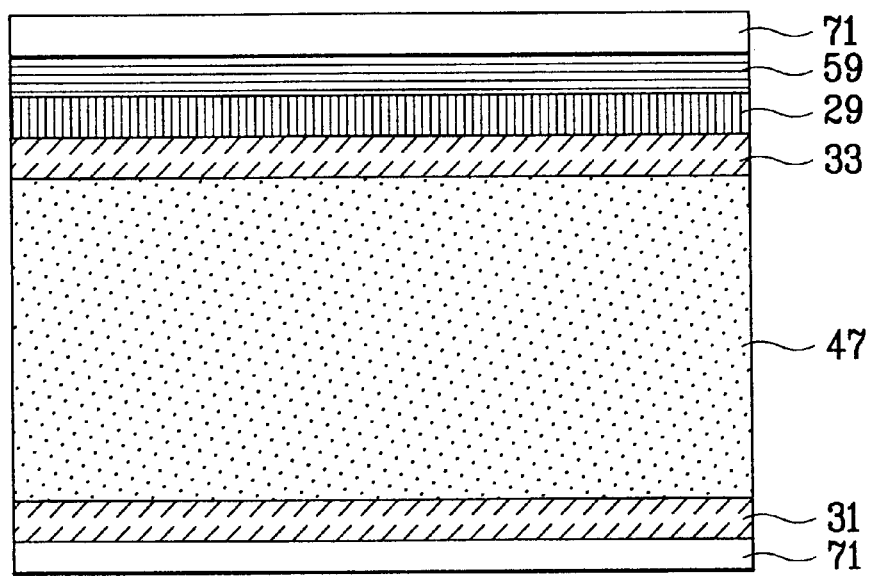
Figure 15I:
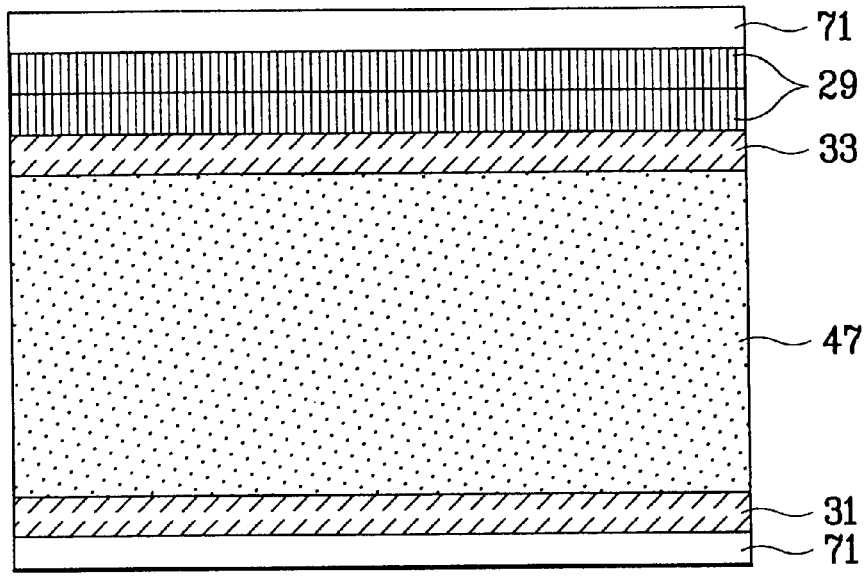
Figure 15J:
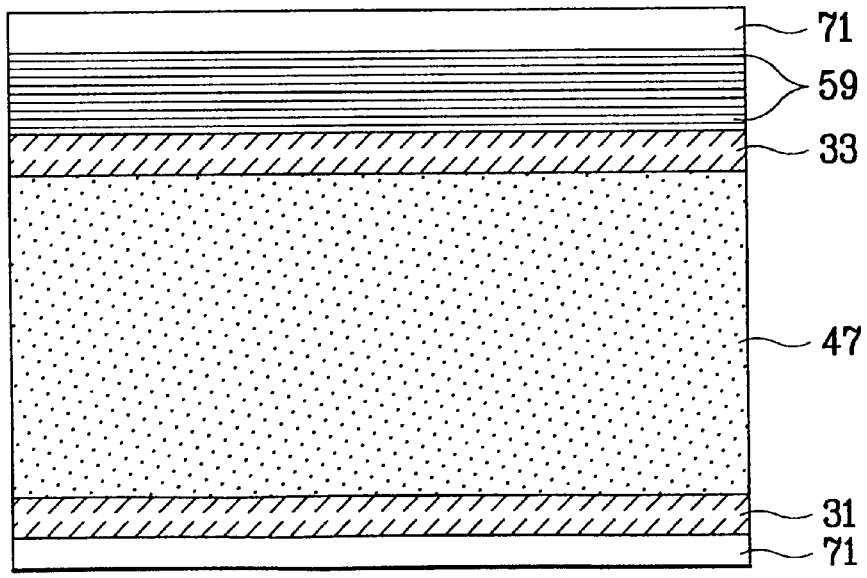

FIGS. 15A and 15B are sectional views showing a uniaxial film ($n_x=n_y>n_z$ or $n_x>n_y=n_z$) or a biaxial film ($n_x-n_z>n_x-n_y$) formed on the second substrate 33. FIGS. 15C to 15F are sectional views in which a uniaxial film or a biaxial film is formed on the first substrate and the second substrate or a uniaxial film and a biaxial film are respectively formed on the first substrate and the second substrate. FIGS. 15G and 15H are sectional views showing two uniaxial films or two biaxial films formed on the second substrate. FIGS. 15I and 15J are sectional views showing a uniaxial film or a biaxial film formed on the second substrate.

After attaching the phase difference film, a polarizer 71 is attached on both substrates 31, 33. The polarizer may be formed integrally with the phase difference film.

In the liquid crystal display device according to the second to seventh embodiments of the present invention (FIGS. 9–14), a pair of neighboring pixels, electric field induction windows 51 and dielectric structures 53 are shown. The electric field induction windows 51 are patterned in zig-zag forms for dividing one pixel into three regions, and the dielectric structures 53 are formed within three pixel regions in parallel to the electric field induction windows. A projection or a small electric field induction window is formed at a boundary portion of the pixel regions, their bending or corner portion, or their crossing portion.

FIGS. 9A, 10A, 11A, 12A, 13A and 14A show a variety of configurations of the electric field induction windows 51 and the dielectric structures 53 according to the present invention.

FIGS. 9B, 10B, 11B, 12B, 13B and 14B show a variety of configurations of the common auxiliary electrode 15 formed on the boundary portion of the pixel regions according to the present invention. FIGS. 9C, 10C, 11C, 12C, 13C and 14C show a variety of configurations of the common auxiliary electrode 15 formed in a region corresponding to the boundary of the three pixel regions and the electric field induction window 51 according to the present invention.

In FIGS. 11 and 12, a fine projection is formed in the electric field induction window and acts to eliminate shadows so that a spot on the liquid crystal display device is removed. In FIGS. 13 and 14, a cut-off portion is formed in a boundary between a corner and a domain of the pixel region so that the cut-off portion acts as a shadow remover.

In the multi-domain liquid crystal display device of the present invention, the dielectric structure 53 is formed on the pixel electrode and/or the common auxiliary electrode. Alternatively, the pixel electrode, the passivation film, the gate insulating film, the color filter layer, an overcoat layer, and/or the common electrode are patterned to form the electric field induction window 51 in the shape of a hole or slit. Thus, electric field distortion effect and the multi-domain can be realized.

The electric field induction window 51 or the dielectric structure 53 causes a multi-domain effect. Also, the electric field induction window 51 or the dielectric structure 53 may be formed on either the first substrate or the second substrate, independently or on both substrates.

Additionally, in the multi-domain liquid crystal display device of the present invention, an alignment film (not shown) is formed on the first substrate and/or the second substrate. The alignment film is formed of a material such as polyamide, polyamide-based compound, polyvinylalcohol (PVA), polyamic acid, or $SiO_2$. If the alignment direction is determined by rubbing, any material suitable for rubbing may be used as the alignment film. Also, a photo-reactive material such as PVCN (polyvinylcinnamate), PSCN (polysiloxanecinnamate), or CelCN (cellulosecinnamate) may be used as the alignment film. The other materials suitable for photo-alignment may be used as the alignment film.

Light is radiated onto the photo-alignment film at least one time to determine a pretilt angle and alignment direction or pretilt direction of the director of the liquid crystal molecule at the same time, thereby obtaining stable alignment of the liquid crystal. Tilt-irradiation once, or vertical tilt-irradiation twice may be performed. The light used for the photo-alignment is suitable for light in an ultraviolet region. Non-polarized light, unpolarized light, linear-polarized light or partially polarized light may be used for the photo-alignment.

The photo-alignment or rubbing is applicable to one of the first substrate and the second substrate or both substrates. Different alignment methods are applicable to both substrates. Alignment process is optional and may not be performed even after forming the alignment film.

Furthermore, the aforementioned alignment is performed to form the multi-domain liquid crystal display device divided into at least two regions. Thus, the liquid crystal molecule of the liquid crystal layer may be aligned differently on each region. In other words, each pixel is divided into four regions in + shape or X shape, or each pixel is divided in horizontal, vertical, or diagonal direction. Alignment process or alignment direction is varied depending on each region and each substrate, so that multi-domain effect can be realized. At least one region of the divided regions may be an unaligned region or all the divided regions may be unaligned.

As aforementioned, the multi-domain liquid crystal display device has the following advantages.

The common auxiliary electrode is formed on the same layer as the gate lines around and in the pixel region, and the electric field induction windows and the dielectric structures as well as the common auxiliary electrode are formed within the pixel region, so that response time of the liquid crystal display device is reduced and the viewing angle is improved, thereby improving the multi-domain effect. In addition, at least one or more electric field induction windows and the dielectric structures are formed in a plurality of directions within one pixel, and the projection is additionally formed, so that residual images and disclination caused by uneven electric field can be removed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device having an array of pixels, comprising:
   a first substrate;
   a second substrate;
   a plurality of gate lines and data lines on one of the first and second substrates, the gate and data lines being substantially perpendicular to one another;
   a liquid crystal layer between the first and second substrates;
   a plurality of ribs positioned over the first substrate, the plurality of ribs being spaced from each other, wherein at least a portion of one of said ribs is not parallel to either the gate lines or the data lines; and
   a pixel electrode having a plurality of slits, wherein at least a portion of one of said slits is not parallel to either the gate lines or the data lines.

2. The liquid crystal display device according the claim 1, further comprising a side electrode between two of the slits.

3. The liquid crystal display device according the claim 2, wherein the side electrode is positioned below the pixel electrode and above the second substrate.

4. The liquid crystal display device according the claim 1, further comprising two side electrodes, each side electrode being positioned between two of the slits.

5. The liquid crystal display device according to claim 1, wherein the plurality of slits includes three slits.

6. A liquid crystal display device having an array of pixels, comprising:
   a first substrate;
   a second substrate;
   a liquid crystal layer between the first and second substrates;
   a plurality of ribs positioned over the first substrate, the plurality of ribs being spaced from each other and wherein the plurality of slits includes at least three slits; and
   a pixel electrode having a plurality of slits, each one of the plurality of slits being positioned between two of the ribs, wherein the three slits form a zig-zag shape.

7. The liquid crystal display device according to claim 1, wherein a first pixel in the array of pixels has three sections, each section having a corresponding slit and ribs.

8. A liquid crystal display device having an array of pixels, comprising:
   a first substrate;
   a second substrate;
   a liquid crystal layer between the first and second substrates;
   a plurality of ribs positioned over the first substrate, the plurality of ribs being spaced from each other; and
   a pixel electrode having a plurality of slits, each one of the plurality of slits being positioned between two of the ribs,
   wherein two contiguous sections within the first pixel have corresponding slits formed in a direction substantially symmetrical to each other.

9. The liquid crystal display device according to claim 7, wherein two ribs sandwich each slit in each section.

10. The liquid crystal display device according to claim 9, wherein the two ribs are positioned substantially symmetrical to each other about each slit in each section.

11. A liquid crystal display device having an array of pixels, comprising:
    a first substrate;
    a second substrate;
    a liquid crystal layer between the first and second substrates;
    a plurality of ribs positioned over the first substrate, the plurality of ribs being spaced from each other; and
    a pixel electrode having a plurality of slits, each one of the plurality of slits being positioned between two of the ribs;
    wherein at least one of the two ribs has end portions bending towards the slit.

12. The liquid crystal display device according to claim 11, wherein an end portion of one of the two ribs of at least one of the sections is configured to eliminate shadow.

13. The liquid crystal display device according to claim 11, wherein an end portion of one of the two of the sections is configured to eliminate shadow.

14. The liquid crystal display device according to claim 7, wherein two contiguous pixels in the array of pixels each has three sections, each section having a corresponding slit and ribs, the slit of each section of the two contiguous pixels being substantially symmetrical.

15. The liquid crystal display device according to claim 14, wherein the ribs of each section are connected to each of the ribs of the other sections.

16. The liquid crystal display device according to claim 14, further comprising a side electrode at least one section of each pixel.

17. The liquid crystal display device according to claim 14, further comprising a side electrode at each boundary between the sections.

18. The liquid crystal display device according to claim 17, wherein the side electrode is contiguous from one section boundary of one pixel to another section boundary of another pixel.

19. The liquid crystal display device according to claim 1, further comprising a light shielding layer and a color filter layer between the first substrate and the ribs.

20. The liquid crystal display device according to claim 1, wherein each of the pixels is divided into three sections to form a multi-domain pixel.

21. The liquid crystal display device according to claim 7, wherein each section has a plurality of miniature slits adjacent a boundary between two sections.

22. A liquid crystal display device having an array of pixels comprising:
    a first substrate;
    a second substrate;
    a liquid crystal layer between the first and second substrates;
    a plurality of ribs positioned over the first substrate, the plurality of ribs being spaced from each other; and
    a pixel electrode having a plurality of slits, each one of the plurality of slits being positioned between two of the ribs;
    wherein a first pixel in the array of pixels has three sections, each section having a corresponding slit and ribs and a plurality of miniature slits adjacent a boundary between two sections and wherein the plurality of miniature slits are configured to eliminate shadow.

23. The liquid crystal display device according to claim 14, wherein the ribs of two contiguous pixels form a diamond shape.

24. The liquid crystal display device according to claim 23, further comprising a plurality of miniature ribs within the diamond shape.

25. A liquid crystal display device having an array of pixels, comprising:
- a first substrate;
- a second substrate;
- a plurality of gate lines and data lines on one of the first and second substrates, the gate and data lines being substantially perpendicular to one another;
- a liquid crystal layer between the first and second substrates;
- a plurality of ribs positioned over the first substrate, the plurality of ribs being a zig-zag shape; and
- a pixel electrode having a plurality of slits, the slits being patterned, wherein at least a portion of one of said slits is not parallel to either the gate lines or the data lines.

26. A liquid crystal display device having an array of pixels, comprising:
- a first substrate;
- a second substrate;
- a liquid crystal layer between the first and second substrates;
- a plurality of ribs positioned over the first substrate, the plurality of ribs being a zig-zag shape; and
- a pixel electrode having a plurality of slits, the slits being patterned, wherein each of the ribs has one or more projections.

27. The device according to claim 26, wherein the projection is configured to eliminate shadow.

28. The device according to claim 1, wherein the ribs comprise a dielectric material.

29. The device according to claim 25, wherein the ribs comprise a dielectric material.

30. The liquid crystal display device according the claim 4, wherein the side electrode is positioned below the pixel electrode and above the second substrate.

31. The liquid crystal display device according to claim 5, wherein the three slits form a zig-zag shape.

32. The liquid crystal display device according to claim 7, wherein two contiguous sections within the first pixel have corresponding slits formed in a direction substantially symmetrical to each other.

33. The liquid crystal display device according to claim 9, wherein at least one of the two ribs has end portions bending towards the slit.

34. The liquid crystal display device according to claim 33, wherein an end portion of one of the two ribs of at least one of the sections is configured to eliminate shadow.

35. The liquid crystal display device according to claim 33, wherein an end portion of one of the two of the sections is configured to eliminate shadow.

36. The liquid crystal display device according to claim 21, wherein the plurality of miniature slits are configured to eliminate shadow.

37. The liquid crystal display device according to claim 14, wherein the ribs of two contiguous pixels form a diamond shape.

38. The liquid crystal display device according to claim 39, further comprising a plurality of miniature ribs within the diamond shape.

39. The device according to claim 25, wherein each of the ribs has one or more projections.

40. The device according to claim 41, wherein the projection is configured to eliminate shadow.

* * * * *